(12) United States Patent
Shimada

(10) Patent No.: US 8,385,719 B2
(45) Date of Patent: Feb. 26, 2013

(54) VIDEO REPRODUCING APPARATUS AND METHOD

(75) Inventor: Masaaki Shimada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 690 days.

(21) Appl. No.: 12/528,263

(22) PCT Filed: Feb. 29, 2008

(86) PCT No.: PCT/JP2008/053600
§ 371 (c)(1),
(2), (4) Date: Aug. 21, 2009

(87) PCT Pub. No.: WO2008/114595
PCT Pub. Date: Sep. 25, 2008

(65) Prior Publication Data
US 2010/0098389 A1    Apr. 22, 2010

(30) Foreign Application Priority Data
Mar. 22, 2007  (JP) ................................. 2007-074363

(51) Int. Cl.
*G11B 27/00*    (2006.01)
*H04N 5/93*    (2006.01)
(52) U.S. Cl. ............... 386/278; 386/E5.068; 386/E5.003
(58) Field of Classification Search .................. 386/278, 386/E5.003, E5.068
See application file for complete search history.

(56) References Cited

U.S. PATENT DOCUMENTS

| 6,028,979 | A  | * | 2/2000  | Hirayama et al. ............ 386/243 |
| 7,519,278 | B2 | * | 4/2009  | Ikeda et al. .................... 386/244 |
| 7,606,471 | B2 |   | 10/2009 | Kelly et al. |
| 2006/0078301 | A1 | | 4/2006 | Ikeda et al. |
| 2006/0127051 | A1 | | 6/2006 | Tsumagari et al. |

FOREIGN PATENT DOCUMENTS

| EP | 0 677 843 A1 | 10/1995 |
| JP | 2004-207904 A | 7/2004 |
| JP | 2005-269595 A | 9/2005 |
| JP | 2006-4486 A | 1/2006 |
| JP | 2006-50570 A | 2/2006 |
| JP | 2006-126522 A | 5/2006 |
| JP | 2006-525717 A | 11/2006 |
| WO | WO-2004/098180 A1 | 11/2004 |

* cited by examiner

*Primary Examiner* — Thai Tran
*Assistant Examiner* — Girumsew Wendmagegn
(74) *Attorney, Agent, or Firm* — Birch, Stewart, Kolasch & Birch, LLP

(57) ABSTRACT

In a reproducing apparatus capable of displaying text subtitles in synchronization with an AV stream, before the AV stream is reproduced, text subtitle streams and font information are read into a preload buffer section (122, 123) in a sequence determined by a priority language setting section (131), and subtitle images are generated from the text subtitle streams and font information and displayed overlaid on the image information of the AV stream. Even if a preload buffer section with a small memory size is used, when the text subtitle language is switched, the text subtitle display can be switched smoothly, with little likelihood of interrupting the audio-video display.

10 Claims, 17 Drawing Sheets

FIG.6

| # | SUBTITLE LANGUAGE | AUDIO LANGUAGE | REPRODUCTION TIME |
|---|---|---|---|
| 1 | JAPANESE | ENGLISH | 01:00:00 |
| 2 | JAPANESE | KOREAN | 01:00:00 |
| 3 | ENGLISH | ENGLISH | 01:30:00 |
| 4 | CHINESE | ENGLISH | 01:00:00 |
| 5 | NONE | JAPANESE | 01:30:00 |
| 6 | KOREAN | ENGLISH | 00:30:00 |
| 7 | KEREAN | KOREAN | 00:30:00 |
| 8 | JAPANESE | ENGLISH | 01:00:00 |

601 — SUBTITLE LANGUAGE
602 — AUDIO LANGUAGE
603 — REPRODUCTION TIME
600

| TOTAL REPRODUCTION TIME | 08:00:00 |
|---|---|

| # | SUBTITLE LANGUAGE | AUDIO LANGUAGE | REPRODUCTION TIME | DISC IDENTIFICATION NUMBER | STUDIO IDENTIFICATION NUMBER | PLAYLIST NUMBER |
|---|---|---|---|---|---|---|
| 1 | JAPANESE | ENGLISH | 01:30:00 | 123 | 456 | 001 |
| 2 | JAPANESE | KOREAN | 01:00:00 | 777 | 246 | 003 |
| 3 | ENGLISH | ENGLISH | 01:30:00 | 345 | 754 | 002 |
| 4 | CHINESE | ENGLISH | 01:00:00 | 123 | 456 | 001 |
| 5 | NONE | JAPANESE | 01:30:00 | 663 | 129 | 001 |
| 6 | KOREAN | ENGLISH | 00:15:00 | 123 | 456 | 002 |
| 7 | KOREAN | CHINESE | 00:15:00 | 654 | 007 | 004 |
| 8 | JAPANESE | ENGLISH | 01:00:00 | 003 | 457 | 001 |

| TOTAL REPRODUCTION TIME | 08:00:00 |
|---|---|

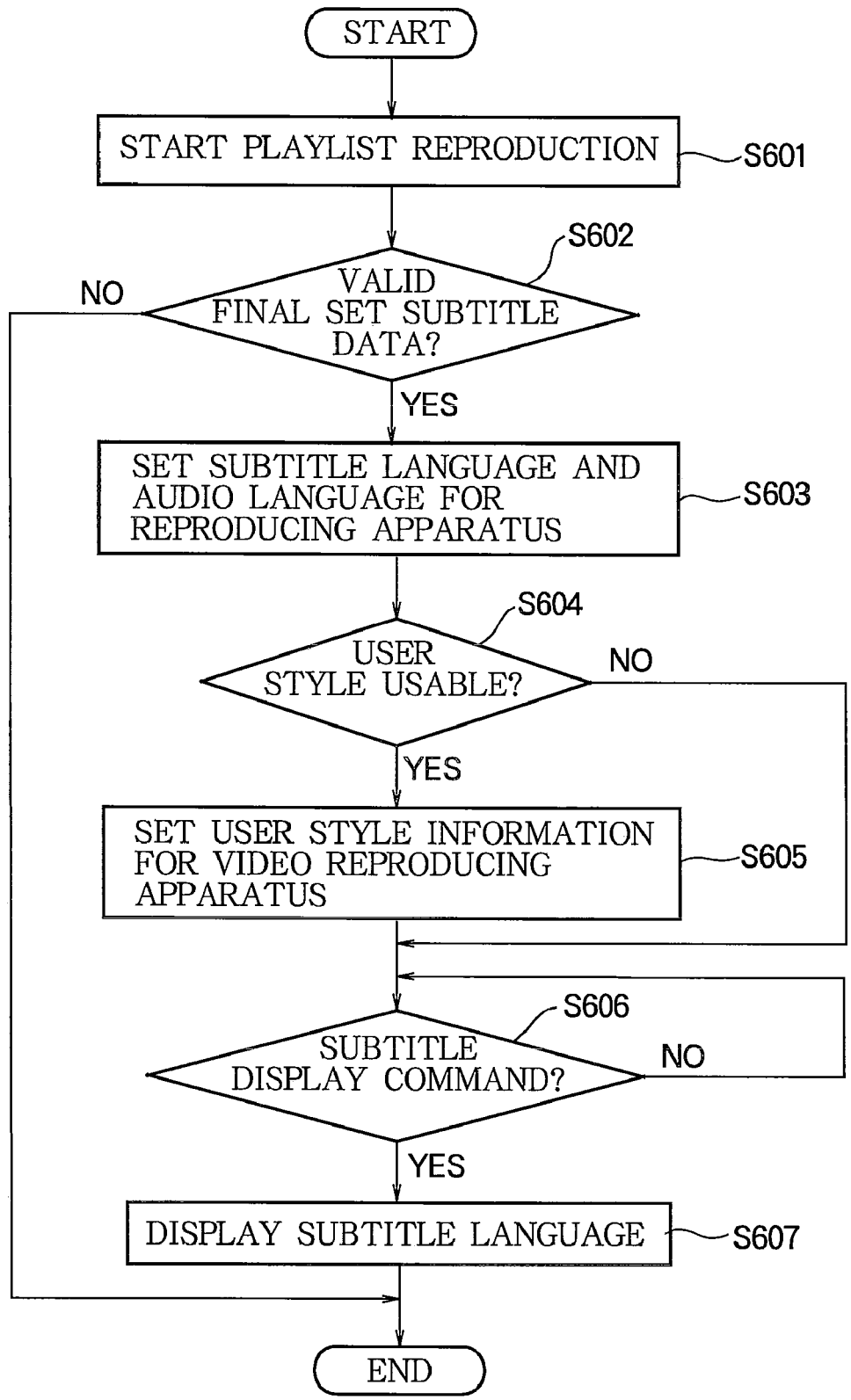

VIDEO REPRODUCING APPARATUS AND METHOD

FIELD OF THE INVENTION

The present invention relates to a video reproducing apparatus for reproducing video information stored in portable recording media such as optical discs, and a method of reproducing video, more particularly to a video reproducing apparatus and method operable to display text subtitles.

BACKGROUND ART

A known standard for reproducing encoded and compressed AV (audio-video) stream information that has been recorded on an optical disc is the DVD standard. Under the DVD standard, subtitle data are multiplexed with video and audio data in the recorded AV stream information. However, because subtitle data are recorded as image information such as bit maps in the DVD standard, when subtitles are displayed on a large screen, there has been a risk of degraded display quality due to deformed subtitle outlines. Moreover, because the subtitles are recorded as image information, the size, color, and font of the displayed subtitles cannot be changed on the basis of user input.

These problems are addressed by a known type of video reproducing apparatus in which text subtitle stream information, in which character code information is multiplexed, is recorded together with AV stream information and font files on an optical disc; while video and audio are being reproduced from the AV stream information, text subtitle images can be reproduced from the text subtitle stream information and the font files, and the text subtitle images can be overlaid on the video picture (see, for example, Patent Document 1). To reproduce audio and video from the AV stream information, however, it is necessary to read large quantities of information continuously. It is consequently difficult to read video and audio data from a disc and simultaneously read text subtitle stream information from the same disc, because of the relatively low access speed of an optical disc. Therefore, in this type of video reproducing apparatus, before the AV stream information is reproduced, the text subtitle stream information and font files, which are smaller in size than the AV stream information, are pre-read (preloaded) into buffers in the video reproducing apparatus.

The art described in Patent Document 1 enables subtitle image data to be created by use of character code information (text subtitle stream information) and an outline font (font file), making it possible to provide a video reproducing apparatus with which the outlines of letters are not deformed even when viewed on a large screen. Moreover, the font color, the position of the text, and the text style can be changed easily by user operations.

Another type of video reproducing apparatus is known, in which the user determines a subtitle language display priority order in advance by manual operations on an initial setup screen, and the video reproducing apparatus can configure a customized language setting menu according to the priority order (see, for example, Patent Document 2). The art described in this patent document enables the video reproducing apparatus to display a customized language setting menu limited to languages preselected by the user, even if a great many languages are included on the optical disc itself. Selection from a language setting menu generated in this way places less of a language selection burden on the user.
Patent Document 1: Japanese Patent Application Publication No. 2005-269595 (pp. 5-8, FIG. 34)
Patent Document 2: Japanese Patent Application Publication No. 2006-525717 (pp. 2-4, FIG. 4)

DISCLOSURE OF THE INVENTION

Problems to be Solved by the Invention

In the video reproducing device described in Patent Document 1, AV stream information, text subtitle stream information, and font files are recorded on an optical disc, and the device displays subtitle images in synchronization with the video information in the AV stream. When an optical disc that supports a plurality of languages is reproduced, however, to switch subtitle languages without interrupting the reproduction of the audio-video stream output from the AV stream information, the text subtitle stream information and font files containing all the language information related to the AV stream must be held in preload buffers. A consequent problem is the very large size of the necessary preload buffers. This problem can be solved by preloading fewer languages, but then each time the user selects a language, there is an increased probability that the selected language will not be included in the preload buffers and will have to be reread from the low-speed optical disc. There is then a risk that the audio-video display may be interrupted, as well as a problem of poor subtitle language switching response. Patent Document 1 also fails to disclose methods of selecting the subtitle substream information and font files to be loaded into the preload buffers.

The art in Patent Document 2 enables the user to use manual language settings to pre-filter the language settings on the optical disc to be reproduced and display a customized language selection menu, from which the user can choose the language to be displayed without being confused by a large selection of languages. The art in Patent Document 2, however, has problems in that the user has to perform extra operations, such as setting up the languages in advance, and may be perplexed as to which languages to select. The language setup is also used for all content reproduced by the same video reproducing apparatus, regardless of what the content is, without making allowances for cases in which it might be preferable to customize the language selection of an individual optical disc or an individual title to be reproduced. A further inconvenience is that when text subtitles are displayed in a selected language, the subtitle color, display position, and character style are not automatically selected on the basis of set information; the user has to perform these settings manually after the program title is reproduced.

The present invention addresses the above problems with the object of providing a video reproducing apparatus that is unlikely to interrupt the audio-video display when switching subtitles, and can therefore switch the display of text subtitles smoothly.

Means of Solution of the Problems

The present invention provides a video reproducing apparatus that reproduces an audio-video multiplexed AV stream recorded on a portable recording medium, generates subtitle images from font information and one or more text subtitle streams containing language information corresponding to the AV stream, and displays the subtitle images, said video reproducing apparatus comprising:
a preload buffer section into which the text subtitle stream and the font information can be read before the AV stream is reproduced;

a reproduction history storage section in which reproduction history information at the time when the video reproducing apparatus reproduces an AV stream is recorded; and a priority language setting section for reading the reproduction history information recorded in the reproduction history storage section and determining which of a plurality of subtitle languages related to the AV stream to be reproduced has been used most frequently; wherein before the AV stream is reproduced, the text subtitle stream and the font information are read into the preload buffer section in a sequence determined by the priority language setting section, a subtitle image is generated from the text subtitle stream and the font information, and the subtitle image is displayed overlaid on image information of the AV stream.

Effect of the Invention

With the structure described above, before the audio-video display of a program title, the text subtitle stream information and font files necessary for the display of text subtitles related to the program title are not all read into the preload buffer; they are read in a priority order starting from the subtitle language used most frequently. Subtitle changes can therefore be carried out smoothly, without interrupting the reproduction of audio and video, because the frequency of access to the low-speed recording medium when the subtitle language is switched is reduced. Preload buffers with a large memory size are not necessary because the need to store all language information in the preload buffers is eliminated. The memory capacity of the preload buffers can therefore be reduced, and the price of the apparatus can be lowered while maintaining user convenience.

As another effect of the invention, priority language information can be constructed automatically on the basis of a usage history of subtitle setting information and audio setting information at the time when program titles are reproduced. It is therefore unnecessary for the user to carry out troublesome processes such as manually presetting the priority language information.

BRIEF DESCRIPTION OF THE DRAWINGS

FIG. 6 is a drawing showing an example of the reproduction history information shown in the first embodiment according to the present invention.

FIG. 13 is a drawing showing an example of the data structure of the reproduction history information shown in the second embodiment according to the present invention.

FIG. 17 is a drawing illustrating a processing procedure followed when reproduction is resumed in the third embodiment according to the present invention.

EXPLANATION OF REFERENCE CHARACTERS

Figure 1:
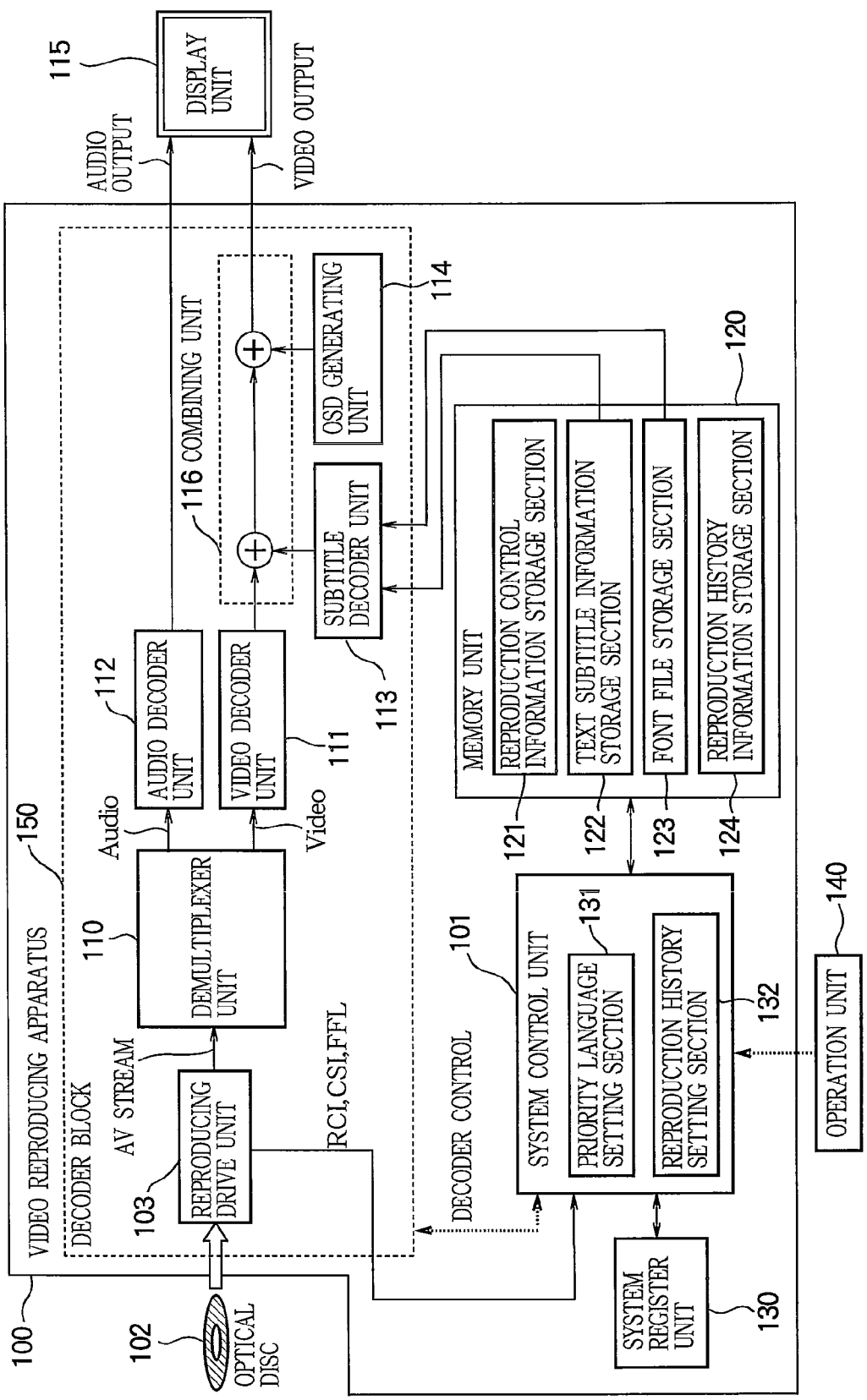
FIG. 1 is a block diagram showing a video reproducing apparatus in a first embodiment according to the present invention.

100 coded video reproducing apparatus, 101 system control unit, 102 optical disc, 103 reproducing drive unit, 110 multiplexer unit, 111 video decoder unit, 112 audio decoder unit, 113 subtitle decoder unit, 114 OSD generating unit, 115 display unit, 120 memory unit, 121 reproduction control information storage section, 122 text subtitle information storage section, 123 font file storage section, 124 reproduction history information storage section, 130 system register unit, 131 priority language setting section, 132 reproduction history setting section, 140 operation unit, 150 decoder block, 201 disc inner circumference side, 202 disc outer circumference side, 210 lead-in area, 211 file management information area, 212 user data area, 213 lead-out area, 220 reproduction control information area, 221 reproduction control information file, 230 stream information area, 231 stream information file, 240 font file recording area, 241 font file, 300 root directory, 301 disc directory, 302 stream management directory, 303 font file recording directory, 400 packet, 401 header information, 402 ID, 501 Studio_ID, 502 Disc_ID, 503 total number of playlists, 504 playlist, 505 total number of stream information files, 506 stream control information, 511 main item, 512 sub-track, 521 stream control information number, 522 display start time, 523 display end time, 524 stream table, 531 video stream attribute information, 532 audio stream attribute information, 533 text subtitle stream attribute information, 534 sub-track number, 535 language information, 541 sub-item, 551 clip information, 552 text subtitle display start time, 553 text subtitle display end time, 554 text subtitle stream name, 555 font data name, 561 stream information file name, 562 attribute information management table, 563 access point management table, 600 reproduction history record (first embodiment), 601 subtitle language, 602 audio language, 603 reproduction time, 604 total reproduction time, 701 playlist usable language list, 702 usage frequency list, 703 language preloading sequence list, 1201 playlist identifying section, 1300 reproduction history record (second embodiment), 1301 disc identification number, 1302 studio identification number, 1303 playlist number, 1401 subtitle style recording section, 1500 subtitle style attribute information, 1501 subtitle language, 1502 audio language, 1503 user settings usage enabled/disabled, 1504 user style history, 1510 user style used/not-used information, 1511 text subtitle color, 1512 text subtitle position, 1513 text subtitle size, 1514 text subtitle style.

BEST MODE FOR CARRYING OUT THE INVENTION

First Embodiment

In relation to a video reproducing apparatus, the first embodiment provides a video reproducing apparatus 100 that holds subtitle language usage history information and preloads, from among a plurality of text subtitle languages recorded on a portable recording medium, in sequence from the language expected to be used most frequently on the basis of the usage history information.

In the description below the portable recording medium is an optical disc, but the invention can also be applied to portable recording media other than optical discs.

FIG. 1 is a block diagram of the system configuration of the video reproducing apparatus 100 in the first embodiment according to this invention. The system control unit 101 in FIG. 1 controls the video reproducing apparatus 100 as a whole. The optical disc 102 stores AV stream information in which encoded video and audio are multiplexed as will be described below, reproduction control information (RCI) of the optical disc 102, text subtitle stream information (CSI) in which subtitle information is multiplexed, and font files (FFL). Files are reproduced from the optical disc 102 through the reproducing drive unit 103 according to commands from the system control unit 101.

The reproducing drive unit 103 reads and obtains AV stream information files, described later, in which video and audio are multiplexed, from the optical disc 102.

The demultiplexer unit 110 demultiplexes the AV stream information files read into the reproducing drive unit 103 to obtain an encoded and compressed video stream (Video) or audio stream (Audio).

The video decoder unit 111 decodes the video stream demultiplexed by the demultiplexer unit 110, which is encoded by a scheme such as MPEG-2, to a video signal.

The audio decoder unit 112 decodes the audio stream demultiplexed by the demultiplexer unit 110, which is encoded by a scheme such as AC-3, to an output audio signal.

The subtitle decoder unit 113 reads text subtitle information, described below, and font files, and combines their information to generate text subtitle image information.

The purpose of the OSD (On Screen Display) generating unit 114 is to display warning indications, device operating status indications, function selection screens, and other information generated by the system control unit 101 on the screen.

The combining unit 116 combines the video signal generated by the video decoder unit 111, the text subtitle image generated by the subtitle decoder unit 113, and the video signal generated by the OSD generating unit 114 to form an output video signal for a superimposed display.

The display unit 115 displays images based on the above output video signal and performs audio output based on the output audio signal output from the subtitle decoder unit 113 to create video and audio that can be seen and heard.

The memory unit 120 temporarily stores information that is highly likely to be accessed when the optical disc 102 is played, so that the information can be accessed quickly by the system control unit 101.

The memory unit 120 has four memory areas, referred to as the reproduction control information storage section 121, text subtitle information storage section 122, font file storage section 123, and reproduction history information storage section 124.

The reproduction control information storage section 121 is a memory area for temporarily storing reproduction control information (RCI) recorded in the optical disc 102 so that it can be accessed quickly by the system control unit 101. As reproduction control information, it holds program title information recorded on the optical disc 102, video and audio attribute information demultiplexed from the AV stream information, and information indicating relations between reproduction starting time information and reproduction starting position information for each access unit (usually a GOP unit) of the AV stream information.

The text subtitle information storage section 122 is a temporary memory area for temporarily storing a text subtitle stream (CSI), one of the constituents of the text-subtitle-related preload data read out from the reproducing drive unit 103 on command from the system control unit 101; the text subtitle information storage section 122 is used as a preload buffer. Since the text subtitle stream is smaller than the AV stream information files in which the video and audio streams are multiplexed, the system control unit 101 reads the text subtitle stream in which the currently necessary subtitle language is recorded into the text subtitle information storage section 122 before reproduction of the program title (playlist) begins. If the text subtitle information storage section 122 has enough memory capacity, a plurality of text subtitle streams may be read.

When a subtitle language setting is altered by a user operation, the system control unit 101 decides whether the altered text subtitles can be assembled from the information held in the text subtitle information storage section 122 and supplies this information to the subtitle decoder unit 113 if the intended text subtitles are decodable. Since the information has already been read into the text subtitle information storage section 122, this does not affect the AV stream information file being read from the reproducing drive unit 103. Subtitle switching can therefore be carried out smoothly, without interrupting audio-video reproduction. If the text subtitles cannot be decoded with the information in the preload buffers, the optical disc 102 must be accessed again to read the text subtitle stream and store the information in the text subtitle information storage section 122, after which the text subtitles are decoded by the above procedure.

The font file storage section 123 is a temporary memory area for temporarily storing font files (FFL), one of constituents of the preload data related to text subtitles read from the reproducing drive unit 103 by the system control unit 101; the font file storage section 123 is used as a preload buffer. Like the text subtitle streams above, font files are smaller than AV stream information files, so the system control unit 101 reads the font file of the currently necessary language into the font file storage section 123 before reproduction of the program title begins. If the font file storage section 123 has enough memory capacity, a plurality of font files may be read.

When a subtitle language setting is altered by a user operation, the system control unit 101 decides whether the altered text subtitles can be assembled from the information held in the font file storage section 123 and supplies this information to the subtitle decoder unit 113 if the intended text subtitles are decodable. Since the information has already been read into the font file storage section 123, this does not affect the AV stream information file being read from the reproducing drive unit 103. Subtitle switching can therefore be carried out smoothly, without interrupting audio-video reproduction. If the text subtitles cannot be decoded with the information in the preload buffers (the text subtitle information storage section 122 and font file storage section 123), the optical disc 102 must be accessed again to read a font file and store the information in the font file storage section 123, after which the text subtitles are decoded by the above procedure.

The reproduction history information storage section 124 is a storage area for reproduction history information that contains attribute information related to the subtitle language settings and audio language settings used when program titles are reproduced. This storage area is a nonvolatile memory area that stores a history of reproduction operations by the user that relate to subtitle settings, and holds it as information for identifying subtitle languages that are likely to be selected in the future.

Provided it can be accessed by the system control unit 101, the memory unit 120 may be configured as a memory area in the system control unit 101, in a flash memory or DRAM in the video reproducing apparatus 100, or on a recording medium such as an HDD, smart media, or a memory card. The memory unit 120 need not be mounted internally in the video reproducing apparatus 100; instead, it may have a removable configuration. The memory unit 120 has the four storage areas described above, but some of these may be recorded together, or the memory unit 120 may be divided into more than four areas.

The system register unit 130 comprises a plurality of registers capable of storing system parameters that determine the operating status of the video reproducing apparatus 100. As system parameters, it holds the information indicating reproduction status such as the title number (playlist number) that is being reproduced, video and audio reproduction compatibility, and the decodability of each subtitle language.

The priority language setting unit 131 reads reproduction history information stored in the reproduction history information storage section 124 when a program title stored in the optical disc 102 is reproduced, and based on the reproduction history information, generates a language preloading sequence list which lists subtitle languages in a priority order starting from the subtitle language used most frequently. Before reproducing the program title, the priority language setting unit 131 reads the text subtitle stream and font file stored for that language from the optical disc 102, and stores them in the text subtitle information storage section 122 and the font file storage section 123.

With this configuration, when the subtitle language is switched during reproduction of a program title, the subtitle information needed after the switch is highly likely to be stored in the preload buffer, so a video reproducing apparatus is obtained that can change subtitles smoothly, without interrupting audio and video reproduction.

Alternatively, the priority language setting unit 131 may be adapted to change the size of the text subtitle information storage section 122 and a font file storage section 123 in the memory unit 120 dynamically, so that as much preload text subtitle information as possible can be read into them.

When a program title is reproduced from the optical disc 102, the reproduction history setting section 132 commands reproduction history information to be stored in the reproduction history information storage section 124, including the subtitle language and audio language that were displayed and output during the reproduction. The reproduction history setting section 132 records the language of the subtitle and the duration of the subtitle display in the reproduction history information. The purpose of the reproduction history information is to make subtitle setting more convenient for the user, so information on the audio language setting used with the subtitle can also be stored. This scheme enables the subtitle language to be set in correspondence with the audio output language. An example of language setting processing that is more suitable for the user is to display Japanese subtitles when an American movie title is reproduced with English audio output, and to display no subtitles when an American movie title is reproduced with Japanese audio output.

Information identifying the user using the apparatus may be stored together with the subtitle language, as well. This scheme enables language settings to be made, for example, to output Japanese audio with no subtitle display when a child reproduces a program title and to output English audio with English subtitles when a student studying English reproduces the program title.

In the example illustrated, the priority language setting unit 131 and the reproduction history setting section 132 comprise firmware or the like in the system control unit 101, but they may be external to the system control unit 101, or they may be hardware having the requisite functions.

The operation unit 140 is for making requests to the video reproducing apparatus 100 from the user etc. In general, the operation unit 140 is a control panel on the front panel of the video reproducing apparatus 100, or a remote control. The video reproducing apparatus 100 interprets the content of commands given via the operation unit 140, and reproduces arbitrary stream information by controlling the decoder block 150 (comprising the reproducing drive unit 103, the demultiplexer unit 110, the video decoder unit 111, the audio decoder unit 112, the subtitle decoder unit 113, the OSD generating unit 114, and the combining unit 116).

Figure 2:
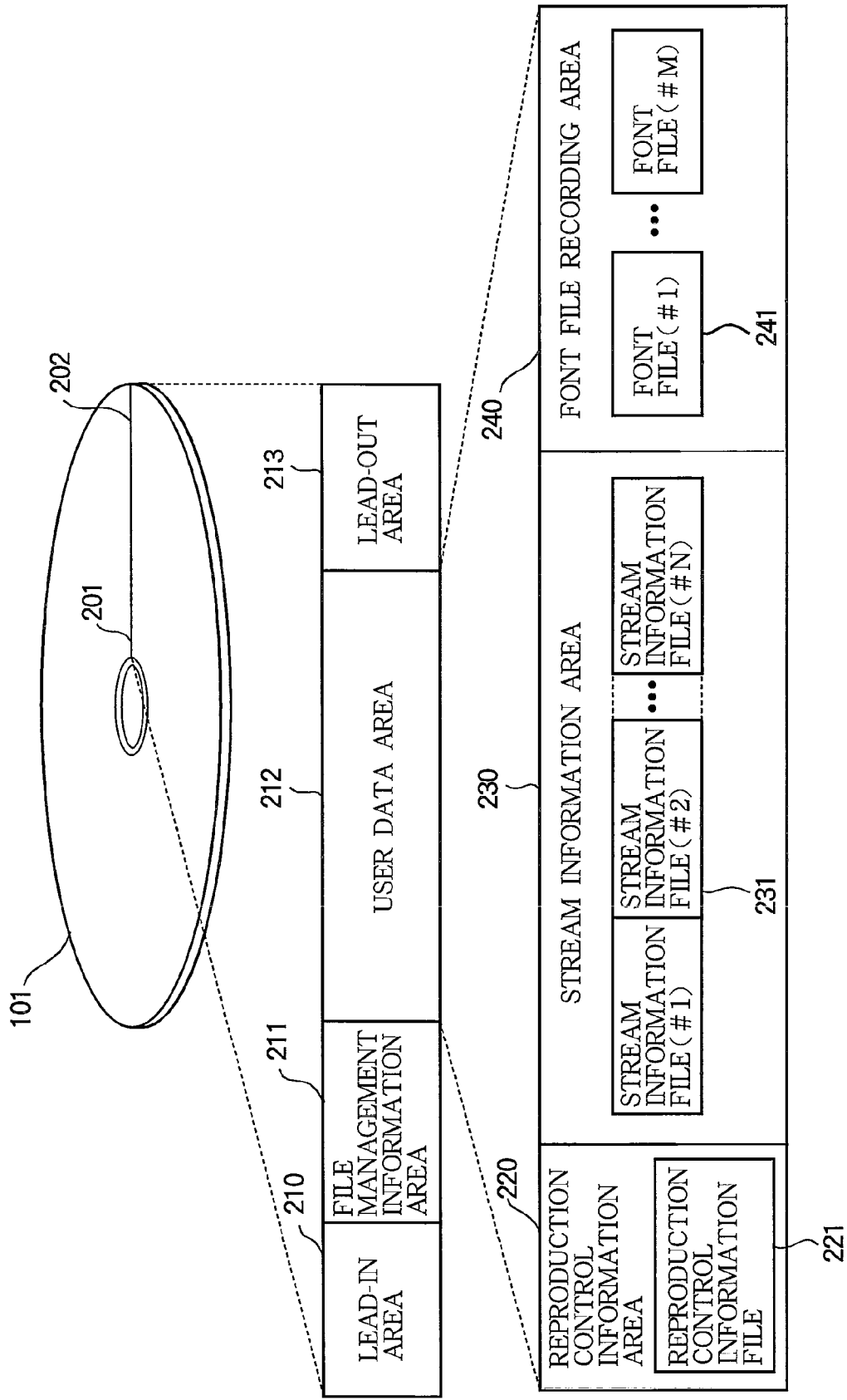
FIG. 2 is a drawing illustrating the appearance of the optical disc shown in the first embodiment according to the present invention and the internal structure of file data.

FIG. 2 shows the appearance of the optical disc 102 and its internal file data structure. The file data on the optical disc 102 in the drawing are recorded from the disc inner circumference side 201 to the disc outer circumference side 202 of the optical disc 102.

Numeral 210 designates a lead-in area in which physical characteristics of the optical disc 102 and starting information are recorded,

211 designates a file management information area in which information about the file system of the optical disc 102 is managed,

212 designates a user data area for recording user data, which may be prerecorded by a content supplier, and

213 designates a lead-out area in which disc ending information is recorded.

The user data area 212 comprises a reproduction control information area 220, a system information area 230, and a font file recording area 240.

The system information area 230 stores one or more stream information files 231 (#1, #2, . . . , #N) that represent one or more multiplexed and compressed streams.

The stream information files 231 are configured either as AV stream information files in which audio and video streams are multiplexed, or as text subtitle streams in which subtitle display timing information and displayed character code information are multiplexed. An AV stream information file can be demultiplexed by the demultiplexer unit 110 to generate a video stream and an audio stream. The description will proceed on the assumption that the video stream is information encoded in compression units such as the GOP (Group of Pictures) units specified in the MPEG-2 ES (elementary stream) standard. A text subtitle stream is a stream of subtitle information in which character code information and output timing information are multiplexed as preload subtitle information for storage in the text subtitle information storage section 122.

One or more font files 241 (#1, #2, . . . , #M) are recorded in the font file recording area 240. The font files 241 are outline fonts, which are combined by the subtitle decoder unit 113 with the character codes stored in the above text subtitle stream to generate text subtitle images. No font files 241 need be recorded on an optical disc 102 that does not require text subtitle display. Nor is it necessary to record font files 241 on the optical disc 102 if the font files 241 are prestored in the video reproducing apparatus 100.

The reproduction control information area 220 stores one reproduction control information file 221. Program title numbers (playlist numbers), the reproduction interval information and reproduction sequence information that constitute a playlist, the address of the starting position of each access point (in general, a GOP), and the display starting time information of the stream information files 231, which are AV stream information files, are listed in the reproduction control information file 221. An access point may be the beginning of a GOP group including a plurality of GOPs. Information identifying the stream information files 231 that indicate text subtitle streams to be reproduced in synchronization with the main video reproduction intervals in a playlist, and the font files 241, is also recorded in the reproduction control information file 221.

Although a case in which reproduction control information is held in one reproduction control information file 221 is described in the first embodiment, this information may be divided among a plurality of files and managed therein. In the example in the figure, all the program title information (playlist information) stored in the optical disc 102 is stored in one reproduction control information file 221, but the information may be divided among a plurality of files and managed therein.

Figure 3:
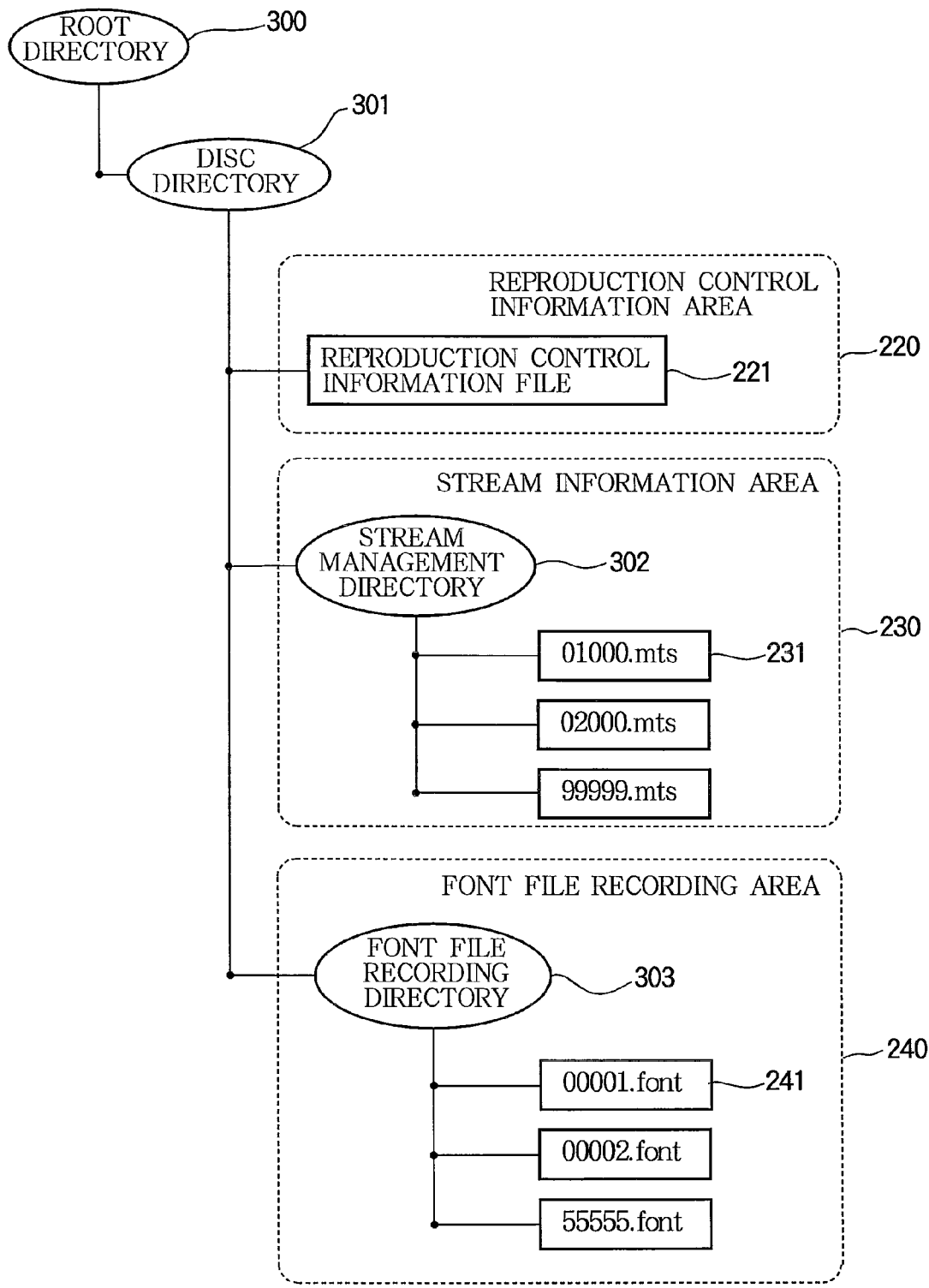
FIG. 3 is a drawing illustrating the logical file structure of the optical disc shown in the first embodiment according to the present invention.

FIG. 3 shows the logical file structure of an optical disc 102 in the first embodiment of this invention. Numeral 300 indicates a root directory, which is the top of the logical file hierarchy, and 301 indicates the disc directory positioned under the root directory in the hierarchy. The disc directory 301 comprises a reproduction control information file 221, which is disc content management information recorded in the optical disc 102, a stream management directory 302, which is a folder in which all of the stream information files 231 are recorded, and a font file recording directory 303, which is a folder in which all of the font files 241 are recorded.

The description will proceed on the assumption that the stream information files 231 and font files 241 in this drawing have five-digit file names. The file names only need to be five-digit names; they need not be sequential. In the illustrated example the stream information files 231 and font files 241 are disposed in separate directories, but they may be disposed in a single directory, or directly in the root directory 300. Also, although the stream information file 231 and font file 241 are shown formed as separate files for certain management units in this example, they may be combined into a single file.

Figure 4:
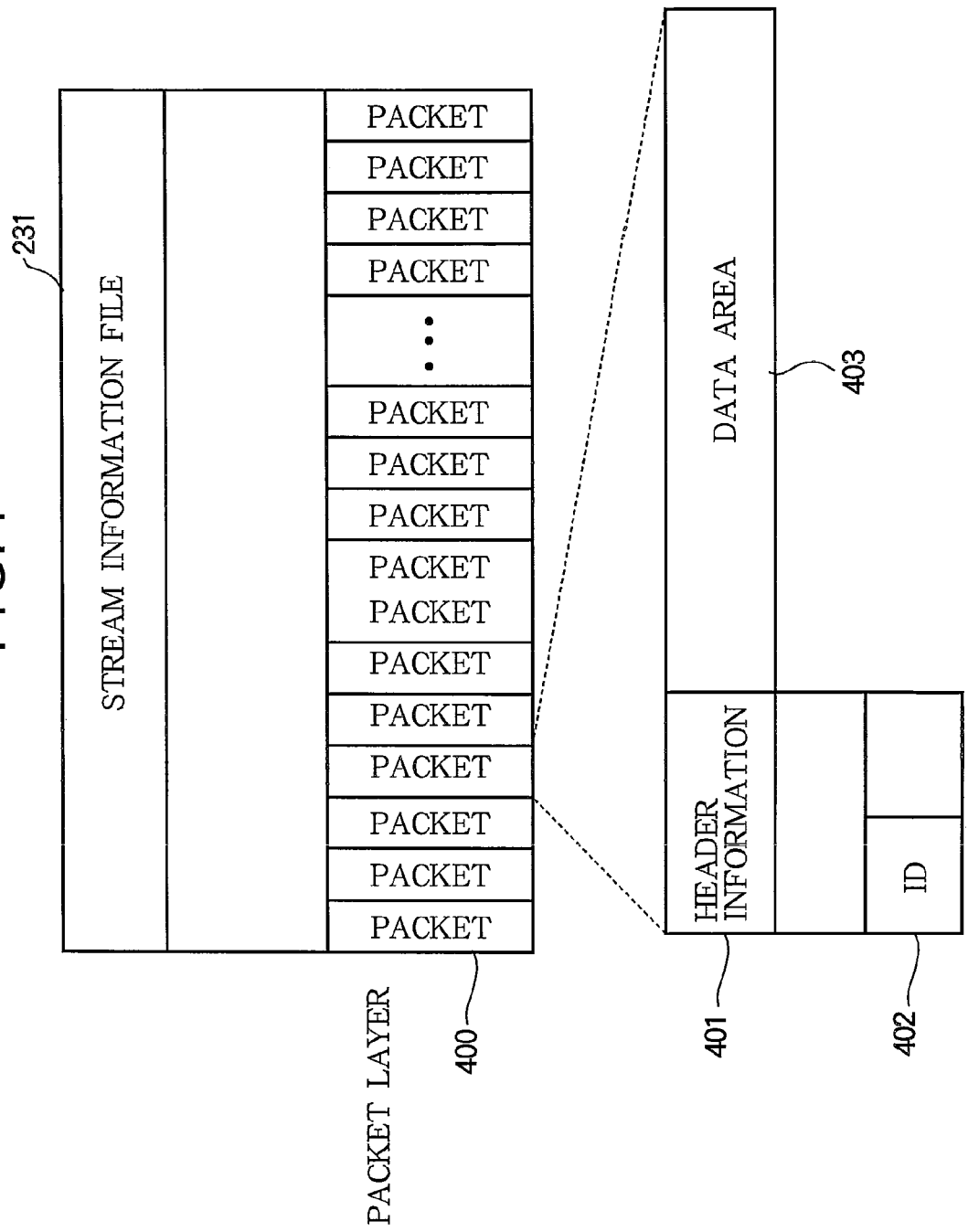
FIG. 4 is a stream configuration drawing illustrating the internal data structure of a stream information file on the optical disc shown in the first embodiment according to present invention.

FIG. 4 is a stream structure diagram showing the internal data structure of a stream information file 231. The stream information file 231 comprises data units of fixed length referred to as packets 400. The video data, the audio data and the stream management data are divided into these packets 400, and multiplexed to form the stream information file 231. A packet 400 begins with header information 401, which is followed by a data area 403. The data in the packet 400 are identified by an ID 402 (Identification) given in the header information 401. The demultiplexer unit 110 separates video data, audio data, subtitle data, stream management data, and so on by recognizing this ID 402.

Figure 5:
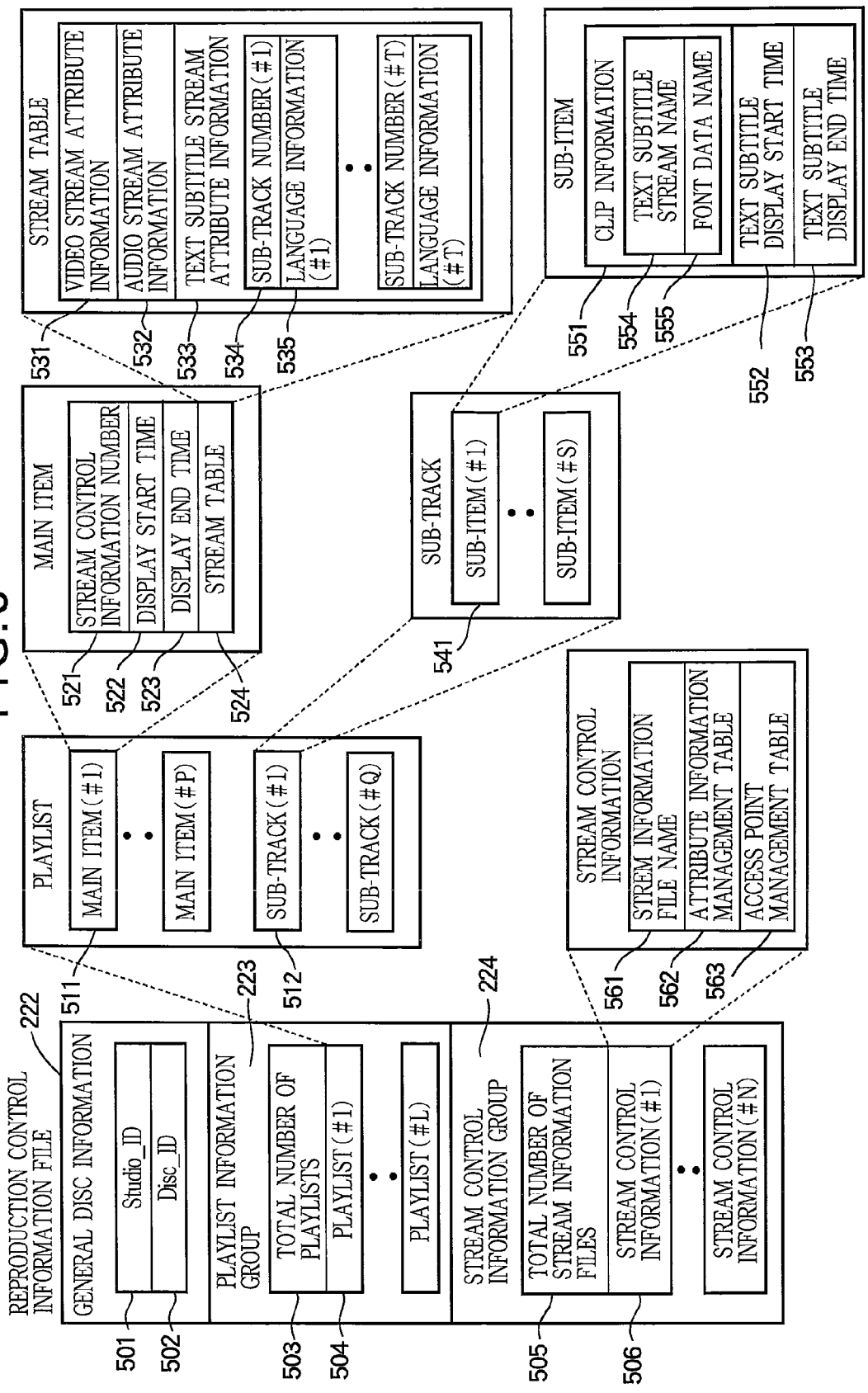
FIG. 5 is a drawing illustrating the general syntax of the reproduction control information file shown in the first embodiment according to the present invention.

FIG. 5 is a drawing illustrating the data structure of the reproduction control information file 221. Recorded in the 'general disc information' 222, which indicates information for identifying the disc, are a Studio_ID 501, which is the identification number of the manufacturer of the disc, and a Disc_ID 502, which is a number identifying the content of the optical disc 102. The content recorded in the optical disc 102 is uniquely identified from among all commercially available discs by the Studio_ID 501 and Disc_ID 502.

The 'playlist information group' 223 in this file indicates playlist information associated with program titles, which are selected by the user. The playlist information group comprises a total number of playlists 503 indicating the total number of program titles stored in the optical disc 102, and one or more items of program title information (playlists) 504 (in the drawing, it is assumed that there are L playlists 504 (#1 to #L)).

The playlist 504 comprises main items 511 (#1 to #P), in which information concerning audio and video reproduction is recorded as the main element of the content, and sub-tracks 512 (#1 to #Q), in which information concerning the reproduction of text subtitles is described. There may be a plurality of main items 511 and sub-tracks 512. When there is a plurality of main items 511, the sequence in which they are reproduced is indicated in the playlist. When a playlist has a plurality of sub-tracks 512, this indicates that it has several selectable tracks, any of which can be selected and reproduced. In particular, if the sub-tracks 512 are text subtitle language tracks and there are four languages, e.g., English, Japanese, Chinese, and Spanish, the playlist has four sub-tracks 512. The description will proceed on the assumption that the playlist 504 in FIG. 5 has P main items 511 and Q sub-tracks 512.

A main item 511 comprises a stream control information number 521 indicating the stream control information number 506 in which the audio and video information to be reproduced is recorded, a display start time 522 in which the reproduction start time is recorded, a display end time 523 in which the reproduction end time is recorded, and a stream table 524 in which information about the streams constituting the main item 511 is collected. The main item 511 thus stores reproduction interval information (information identifying the name of the stream information file to be reproduced, the reproduction starting time, and the reproduction ending time) for each program title; based on the reproduction interval information, the video reproducing apparatus 100 decides which interval is to be reproduced in the multiplexed audio-video stream information files 231.

The stream table 524 stores video stream attribute information 531 that gives information about the video stream, audio stream attribute information 532 that gives information about the audio stream, and text subtitle stream attribute information 533 that gives information about the text subtitle stream.

Sub-track numbers 534 (#1 to #T) indicating the numbers of sub-tracks 512 and language information 535 (#1 to #T) for the subtitles stored in the sub-tracks 512 are written as paired combinations in the text subtitle stream attribute information 533. The subtitle languages that can be selected for the main item 511 that is being reproduced can be obtained by referencing the text subtitle stream attribute information 533, and the selectable languages can be presented to the user to learn the subtitle language the user wants at that particular time. In the description of the text subtitle stream attribute information 533 in FIG. 5, it is assumed that there are T sub-track numbers 534 and T language information items 535.

Sub-items 541 (#1 to #S) giving information concerning reproduction of the individual subtitles are written in a sub-track 512. A plurality of sub-items 541 may be present. There are S sub-items 541 in the first sub-track 512 (#1) in FIG. 5. A sub-item 541 stores clip information 551 giving information related to the text subtitle, a text subtitle display start time 552 that gives the reproduction starting time of the text subtitle, and a text subtitle display end time 553 that gives the reproduction ending time of the text subtitle.

The clip information 551 comprises a text subtitle stream name 554 identifying the stream information file 231 in which the text subtitle stream is stored and a font data name 555 identifying the name of the font file 241 used with the text subtitle stream. The files to be preloaded when reproducing a sub-item 541 can be obtained by reading and referencing the stream information file 231 identified by the text subtitle stream name 554 and the font file 241 identified by the font data name. For example, if the text subtitle stream name 554 is '99999' and the font data name is '00002', '99999.m2ts' is read as the stream information file 231 and '00002.font' is read as the font file 241, for the text subtitle stream.

The 'stream control information group' 224 in the reproduction control information file 221 comprises a total number of stream information files 505 indicating the number of stream information files 231 recorded on the optical disc 102 and stream control information 506 (#1 to #N) indicating information in one-to-one correspondence with the stream information files 231. In the example in FIG. 5, N items of stream control information are recorded, so there are N stream information files. This indicates that in this case, the total number of stream information files 231, including both AV stream information files and files indicating text subtitle streams, is N.

The stream control information 506 comprises a stream information file name 561, an attribute information management table 562 and an access point management table 563. The stream information file name 561 is five-digit numeric information giving the name of the stream information file 231. The attribute information management table 562 stores attribute information of the video information, audio information and other information used in the stream information file 231, and packet IDs 402 of the video, audio, subtitle, and stream management data constituting the stream information files 231. The demultiplexer unit 110 uses these packet IDs 402 to divide the data into video data, audio data, subtitle data, and stream management data.

The access point management table 563 is list information in which the stream readout position and reproduction starting time are recorded for each access point. This information makes random access reproduction such as search and trick play possible. For example if the video data are encoded by the MPEG-2 scheme, the beginning of a GOP (Group of Pictures) corresponds to an access point, and information giving the reproduction starting time and reproduction starting address (the position reference to the head of the stream file) is given for each GOP. The video reproducing apparatus 100 identifies the reproduction starting address of the stream information file 231 from the display start time 522 and the access point management table 563 to perform random access reproduction.

FIG. 6 shows an example of the reproduction history information recorded in the reproduction history information storage section 124 recorded in the first embodiment of this invention. The description will proceed on the assumption that eight reproduction history records 600 (#1 to #8) are stored in this example. A reproduction history record 600 comprises a subtitle language 601, an audio language 602, and a reproduction time 603 indicating the duration of time for which that particular subtitle-audio combination was reproduced. A reproduction history record 600 is generated at every subtitle switching operation during reproduction of the program title (at the start of program title reproduction, subtitle display switching (on/off), switching of subtitle language, switching of audio language). For example the first reproduction history record 600 (#1) indicates that a program was reproduced with subtitle language 'Japanese' and audio language 'English' for one hour.

The total reproduction time 604 indicates the total reproduction time managed by the reproduction history information, that is, the sum of the reproduction times 603 from the first reproduction history record 600 (#1) to the eighth reproduction history record 600 (#8) in the FIG. 6.

The reproduction time 603 represents the duration of time over which the program has been reproduced with subtitles displayed at normal speed, not including pause time and trick play time such as fast-forwarding and rewinding. This time also does not include time during which a subtitle track was selected but subtitle display was switched off.

Although the first embodiment is adapted to add a reproduction history record 600 whenever the combination of subtitle and audio language selections is changed, the list may be configured to focus only on changes in the subtitle language. A reproduction history record 600 may be added after the elapse of a predefined period (five minutes, for example) following a change of language in order to avoid leaving invalid reproduction history records 600 when a selection is due to an operation mistake. In this first embodiment, an example is shown in which a new reproduction history record 600 is added when a combination with the same content is added, but when a reproduction history record 600 having a combination with the same content is already present, the embodiment may be configured to increase the reproduction time 603 of that reproduction history record 600.

In the first embodiment, the quantity of reproduction history information recorded in the reproduction history records 600 is unlimited. To restrict the reproduction history information to a fixed amount of memory space, however, a certain number (for example, one hundred) may be set as the maximum number of reproduction history records 600, and when reproduction history records 600 are recorded in excess of this number, a process such as deleting the data sequentially from the oldest data may be used.

To keep the reproduction history information current, reproduction time/date information may also be recorded and reproduction history records 600 may be deleted after a certain period has elapsed (for example, three months).

An example of the creation of a subtitle language usage frequency list will now be described, using the reproduction history information shown in FIG. 6. If the audio output language of the playlist 504 currently being reproduced is English, for example, the corresponding reproduction history records 600 are extracted. In this case, there are five corresponding reproduction history records 600, (#1), (#3), (#4), (#6), and (#8), from which, taking the subtitle languages individually, the subtitle language 601 with the longest total reproduction time 603 is retrieved. In this configuration, the priority language setting unit 131 ranks the subtitle languages so that those with longer total subtitle display times in the reproduction history information are ranked higher. In the example shown in FIG. 6, a language usage frequency list is created in which the order is 'Japanese', 'English', 'Chinese', 'Korean'. Information giving the number of subtitle switches and the time and date of subtitle switching may be added to the reproduction history record 600, as shown in FIG. 6. In this configuration, the usage frequency list may be generated based on the information giving the number of subtitle switches and the time and date of subtitle switching, or weighting may performed, based on the information giving the number of subtitle switches and the time and date of subtitle switching, as information complementing the reproduction time 603. If this is done, the priority language setting unit 131 ranks the subtitle languages so that those to which the subtitle display was switched more often in the reproduction history information are ranked higher, or so that those with longer total subtitle display times in the reproduction history information are ranked higher, or those with the most recent time and date of subtitle display in the reproduction history information are ranked higher.

Figure 7:
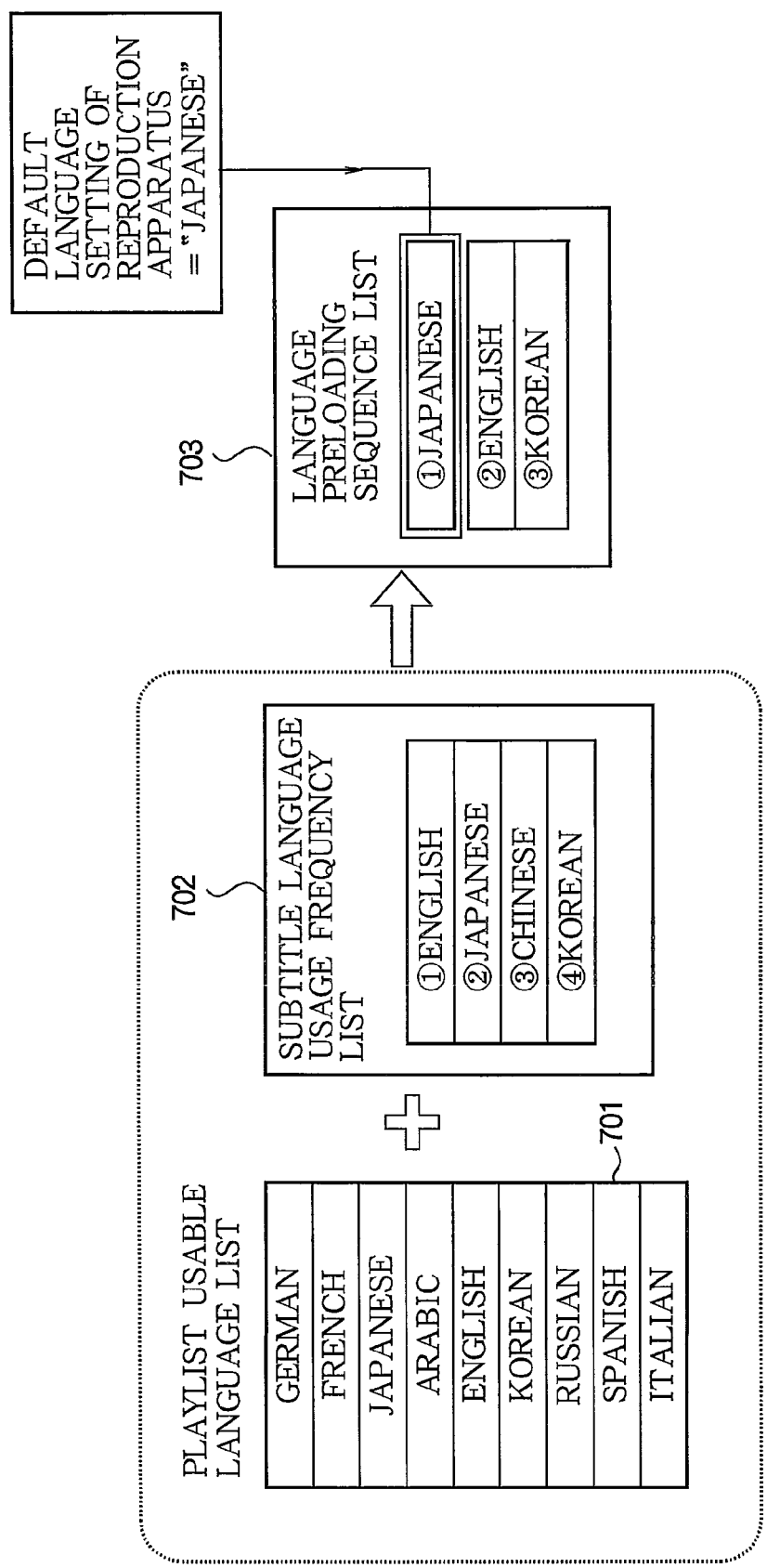
FIG. 7 is a drawing illustrating a method of determining the preloading sequence of the text subtitle languages shown in the first embodiment according to the present invention.

FIG. 7 is an explanatory diagram concerning the method of determining the preloading order in which text subtitle languages are read into the preload buffer in this invention. Numeral 701 indicates a playlist usable language list of available subtitle display languages for the playlist 504 that is being reproduced. The list in FIG. 7 indicates that for the current playlist 504, subtitles can be switched between nine languages: 'German', 'French', 'Japanese', 'Arabic', 'English', 'Korean', 'Russian', 'Spanish', and 'Italian'. Numeral 702 indicates the usage frequency list calculated from the reproduction history information shown in FIG. 6.

Reference numeral 703 designates a language preloading sequence list in which languages included in the playlist usable language list 701 are sorted in the order defined by the usage frequency list 702. When the video reproducing apparatus 100 has a predetermined default subtitle language as shown in FIG. 7, the processing may be adapted so that that language setting is ranked highest (first) on the list. The true order of the language preloading sequence list in FIG. 7 should be 'English', 'Japanese', 'Korean', but since the default subtitle language setting is 'Japanese', the language preloading sequence list 703 is created with the languages arranged in the order 'Japanese', 'English', 'Korean'.

When this list is created, if the state of the usage frequency list 702 differs greatly from the default subtitle language setting of the video reproducing apparatus 100, a default subtitle language setting screen (not shown) may be displayed to the user to allow the user to change the default subtitle language setting of the video reproducing apparatus 100. In this case, the system control unit 101 instructs the OSD generating unit 114 to superimpose a warning screen (not shown) on the display. The system control unit 101 and OSD generating unit 114 then constitute a warning screen display section that notifies the user that the priority language order calculated by the priority language setting unit differs from the priority display language setting of the video reproducing apparatus itself. The user may then be allowed to set the default subtitle language manually on the warning screen, or the language at the top of the language usage frequency list may be set automatically as the default subtitle language. In this configuration, even if the user makes a mistake in setting the default subtitle language, as he or she continues to use the video reproducing apparatus 100, the optimal default language subtitle setting can be made.

Figure 8:
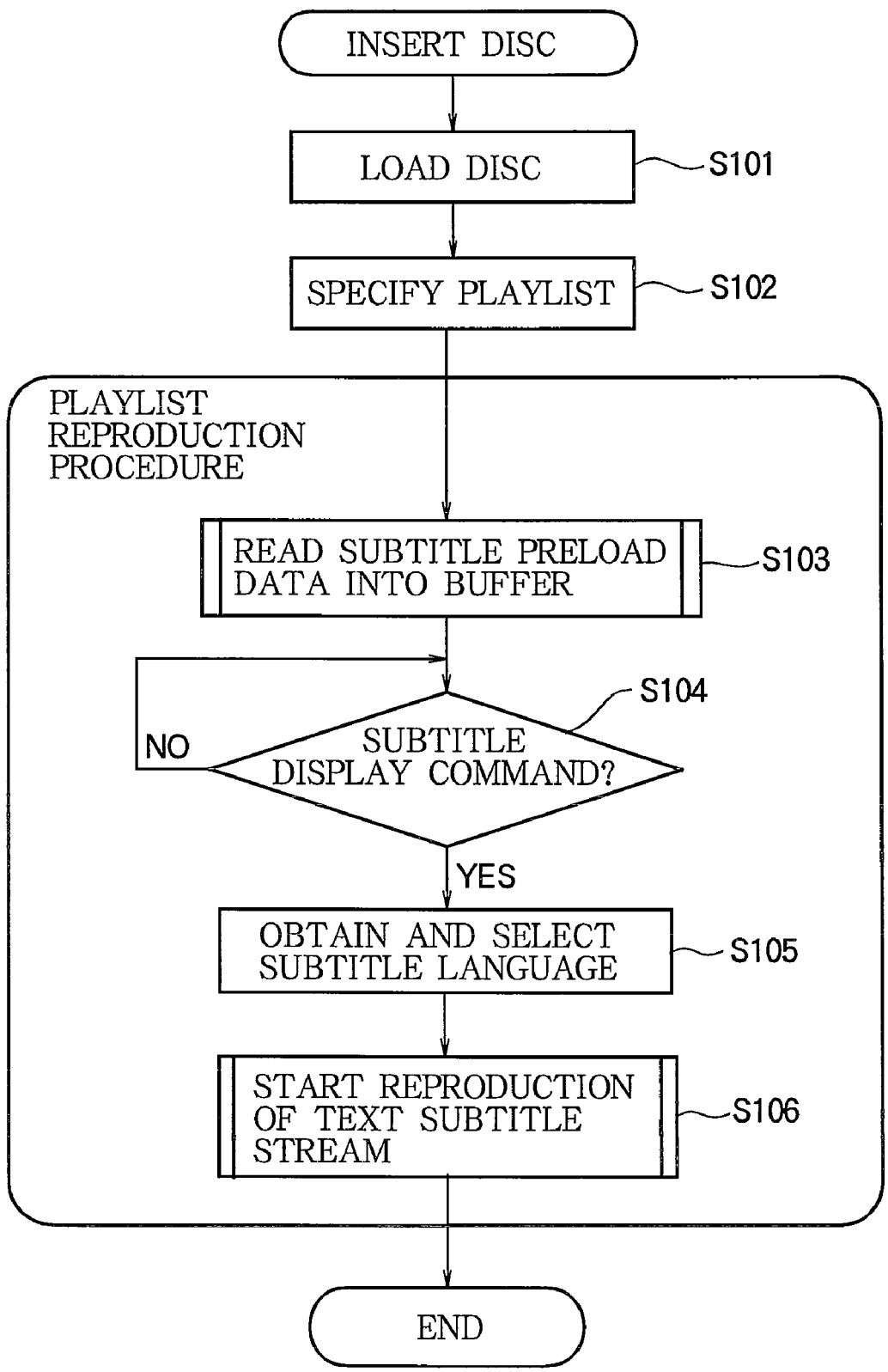
FIG. 8 is a drawing illustrating the general operation flow shown in the first embodiment according to the present invention.

An operational model of the reproduction processing in the video reproducing apparatus 100 shown in FIG. 1 will be described in detail below, based on FIG. 8 (with reference to FIGS. 1 to 7 as appropriate). When an optical disc 102 is inserted in the reproducing drive unit 103, the system control unit 101 reads the file system information stored in the file management information area 211 of the optical disc 102. The logical directory structure shown in FIG. 3 can be developed from the file system information, after which, at the command of the system control unit 101, the reproduction control information file 221 stored on the optical disc 102 is read into the reproduction control information storage section 121 (S101).

After that, when the user gives a play command for an arbitrary program title on the operation unit 140, the command is passed to the system control unit 101. The system control unit 101 reads the playlist 504 corresponding to the program title number (playlist number) from the reproduction control information stored in the reproduction control information storage section 121.

Next, the main item 511 constituting the playlist 504 is read, and the stream information file 231 and the font file 241 associated with the main item 511 are read into the preload buffer (S103). A subtitle display command from the user is then awaited (S104).

When the user gives a subtitle display command, the main item 511 currently being reproduced is obtained from the playlist 504. Next, all the combinations of sub-track numbers 534 and language information 535 are obtained from the text subtitle stream attribute information 533 given in the stream table 524 in the main item 511 (S105). The process that starts reproduction of the text subtitle stream corresponding to the subtitle language selected by the user (as will be described in FIG. 10) is then carried out (S106), and the text subtitle stream is displayed together with the AV stream information files.

Figure 9:
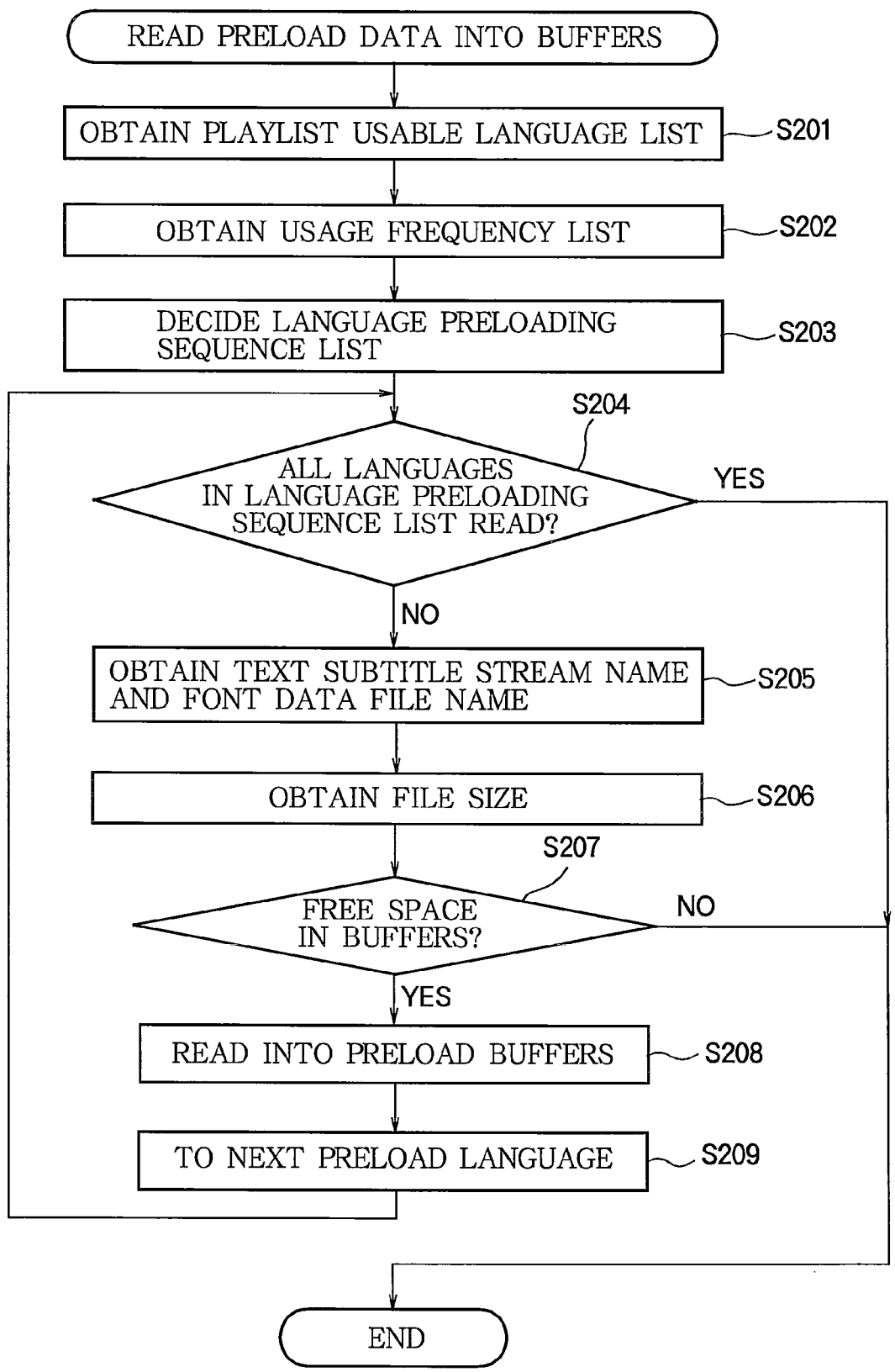
FIG. 9 is a drawing illustrating an operating procedure for copying into the preload buffers shown in the first embodiment according to the present invention.

Next, the procedure (the preload process in step S103 in FIG. 8) that copies the text subtitle streams and font files expected from the playlist 504 to have a high usage frequency into the text subtitle information storage section 122 and the font file storage section 123, which are the preload buffers, will be described by use of FIG. 9.

First the text subtitle stream attribute information 533 stored in the stream table 524 of the main item 511 in the playlist 504 is obtained. The sub-track numbers 534 and language information 535 concerning all subtitle substreams associated with the main item 511 are recorded in the text subtitle stream attribute information 533. A playlist usable language list 701 indicating the selectable subtitles contained in the main item 511 currently being reproduced can be obtained from the sub-track numbers 534 and the language information 535 (S201).

After that, the system control unit 101 generates a usage frequency list 702 from the reproduction history information held in the reproduction history information storage section 124 (S202). The system control unit 101 then determines the language preloading sequence list 703 according to the procedure described in FIG. 7 (S203).

After that, it checks whether language information 535 matching the language code at the top of the language preloading sequence list 703 (the first language code) is present. If matching language information 535 is present, the system control unit 101 obtains the sub-track number 534 recorded in association with that language information 535. Otherwise, it searches for a match with the next data (next language code) in the language preloading sequence list 703. In other words, it checks whether there is language information 535 matching the next (second, third, and so on) language code defined in the language preloading sequence list 703. When matching language information 535 is present, it obtains the sub-track number 534 recorded in association with that language information 535.

When the sub-track number 534 is obtained, the sub-track 512 identified from this information is obtained, all the sub-items 541 in this sub-track 512 are obtained, and the text subtitle stream file names are obtained from the text subtitle stream names written in the clip information 551 in the sub-items 541. Next, font data file names are obtained from the font data names 555 written in the clip information 551 in the sub-items 541 (S205).

After that, in step S206, on command from the system control unit 101, the files recorded in the optical disc 102 and designated by the text subtitle stream names 554 and the font data names 555 are accessed, and the size of each file is obtained.

The system control unit 101 then obtains the amount of empty space in the text subtitle information storage section 122 and font file storage section 123, which form the preload buffers, and checks whether the above file sizes are storable in the preload buffers (S207).

If the preload buffers have ample space, the system control unit 101 reads the relevant text subtitle files (text subtitle stream and font) from the optical disc 102, and stores them in the preload buffers (S208).

After that, the process starting from step S204 is carried out on the next language on the language preloading sequence list 703.

Thus, as long as the preload buffers have free space, a plurality of text subtitle streams and font files are recorded in descending order of their probability of use.

Preload termination processing is carried out when in step S207 the preload buffers do not have enough space to store the text subtitle stream or font file of the next language read from the language preloading sequence list 703.

Preload termination processing is also carried out when the text subtitle streams and font files associated with all the languages listed in the language preloading sequence list 703 have been stored in the preload buffer (S204).

Figure 10:
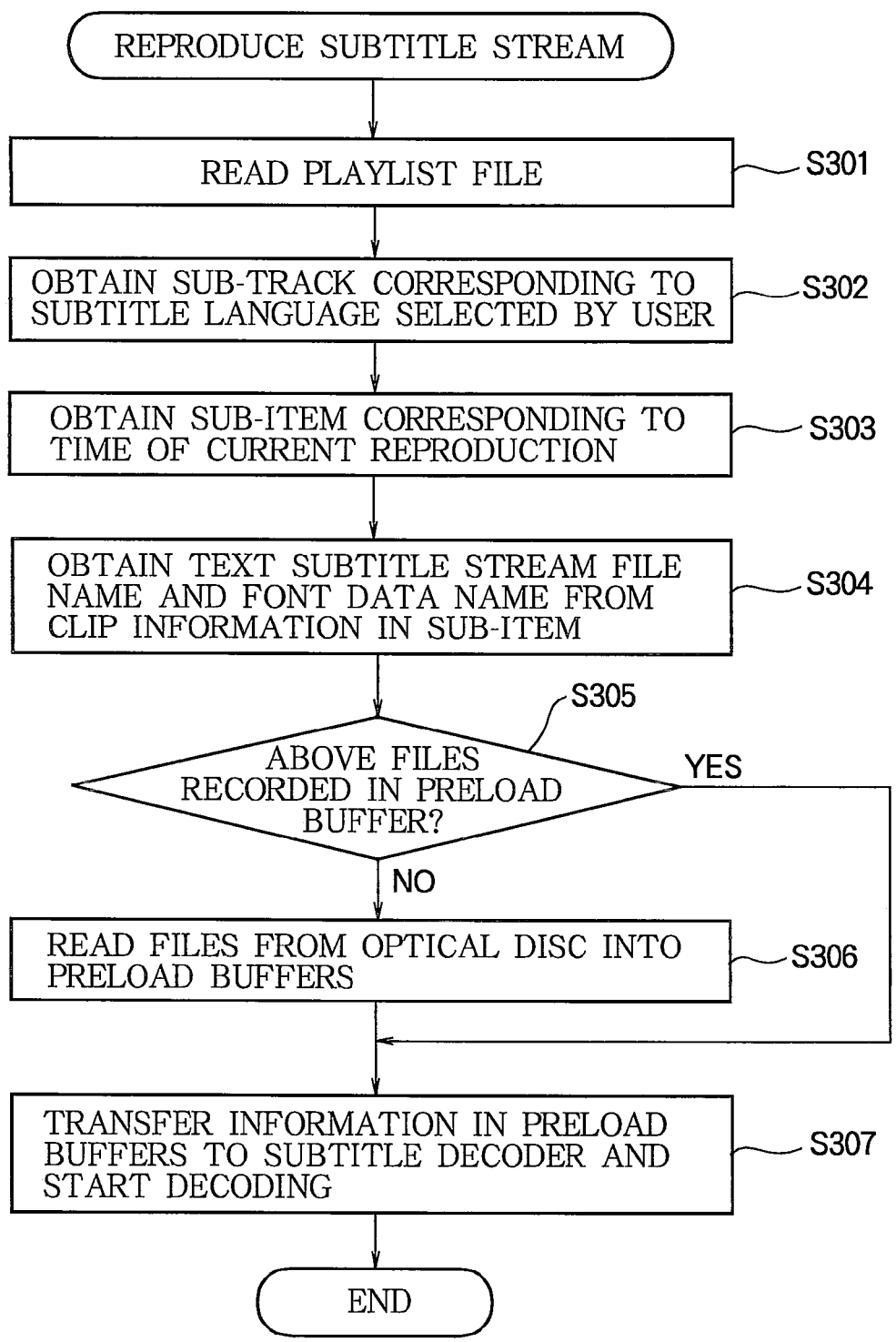
FIG. 10 is a drawing illustrating a text subtitle stream reproduction starting procedure shown in the first embodiment according to the present invention.

FIG. 10 illustrates a procedure in the system control unit 101 for starting reproduction of a text subtitle stream. First, in FIG. 10, information is read from the playlist 504 for which the play command was given (S301). Next, in step S302, the sub-track numbers 534 and the language information 535 associated with the main item 511 of the playlist 504 are obtained and the sub-track number 534 corresponding to the subtitle language selected by the user is identified.

After that, based on time information of the audio-video stream being reproduced, the sub-item 541 corresponding to the time is obtained from the sub-track 512 identified by the obtained sub-track number 534 (S303). The text subtitle stream name 554 and the font data name 555 are obtained from the clip information 551 in the sub-item 541 (S304).

On the basis of the file names obtained in step S304, the system control unit 101 decides whether the information with those file names has been preloaded into the preload buffers, that is, into the text subtitle information storage section 122 and font file storage section 123 (S305). If they have been preloaded, the text subtitle stream and the font file are read from the preload buffers and transferred to the subtitle decoder unit 113. The subtitle images generated by the subtitle decoder unit 113 are then displayed overlaid on the video output (S307).

If the information with the file names obtained in step S304 has not been preloaded, the process proceeds to step S306. In step S306, a command is given to read the files from the file system present in the file management information area 211 on the optical disc 102. The files that are read are then transferred to the preload buffers. After that, the subtitle images generated by the subtitle decoder unit 113 are displayed overlaid on the video output (S307).

Figure 11:
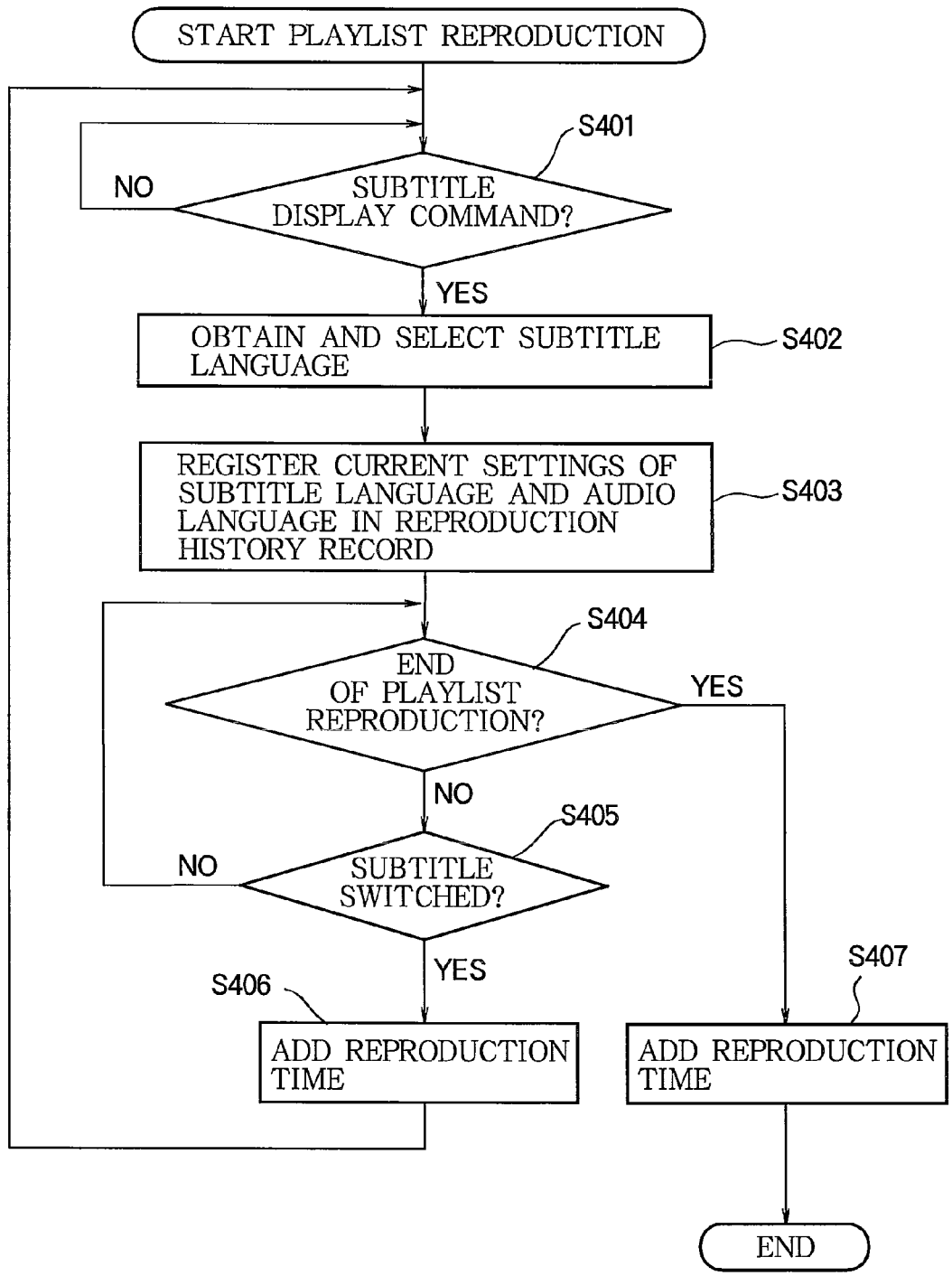
FIG. 11 is a drawing illustrating a reproduction history information recording procedure shown in the first embodiment according to the present invention.

FIG. 11 illustrates a recording procedure for the reproduction history information recorded in the reproduction history information storage section 124. When a program title (playlist) 504 is reproduced, first, a subtitle display command from the user is awaited (S401). When a subtitle display command is given by the user, the system control unit 101 obtains the subtitle language setting information and audio language setting information of the video currently being displayed.

The reproduction history setting section 132 now adds a reproduction history record 600 to the reproduction history information. The language information obtained in step S402 is set in the subtitle language 601 and audio language 602 of the reproduction history record 600 (S403). The record adding process may be adapted to add the record after reproduction has continued for a certain time (five minutes, for example), in order to avoid the addition of unnecessary reproduction history records 600 due to operation mistakes.

After that, the reproduction history setting section 132 decides whether the reproduction of the playlist 504 currently being reproduced has ended (S404). If the playlist 504 has ended, the process proceeds to step S407, and the duration of the reproduction with subtitle display is set in the reproduction time 603 of the reproduction history record 600 (S407). The time during which the subtitles were displayed at normal speed is entered in the reproduction time 603, not including trick play time, pause time, and time during which subtitle display was switched off.

If the reproduction of the playlist 504 has not ended in step S404, next the reproduction history setting section 132 decides whether the present subtitle display settings (and audio language settings) have been changed (S405). A change in the subtitle display setting occurs when subtitle display is switched on or off, when the subtitle language is switched, and at the end of the subtitle display interval of the sub-item 541. If there is no subtitle change, the process returns to step S404. When there is a subtitle change, the process of recording the reproduction time 603 in the reproduction history record 600 is carried out in a manner similar to step S407, followed by a return to step S401.

In the information adding process in step S403, if there is already a reproduction history record 600 with the same combination, the reproduction time 603 in the reproduction history record 600 having the same combination may be increased instead of adding a new reproduction history record 600.

As an effect of the first embodiment, before the audio-video display of a program title, the text subtitle stream information and font files necessary for the display of text subtitles related to the program title are not all read into the preload buffer; they are read in sequence, starting from the information related to the subtitle languages used most frequently. Subtitle changes can therefore be carried out smoothly, without interrupting the reproduction of audio and video, because the frequency of access to the low-speed disc when the subtitle language is switched is reduced. Preload buffers with a large memory size are not necessary because the need to store all language information in the preload buffers is eliminated. The memory capacity of the preload buffers can therefore be reduced, and the price of the apparatus can be lowered while maintaining user convenience. As another effect of this embodiment, language usage frequency information can be automatically accumulated based on a reproduction history of subtitle setting information, audio setting information, and so on at time of reproduction. It is therefore unnecessary for the user to carry out troublesome processes such as manually presetting the priority language information.

Second Embodiment

The first embodiment described a video reproducing apparatus 100 that, for a playlist 504 it had never reproduced previously, recorded subtitle languages in the preload buffers in a sequence starting from the subtitle languages expected to have a high frequency of use, on the basis of the display settings of subtitles reproduced previously. In the second embodiment, for a playlist 504 that has been reproduced previously, the previously used subtitle and audio language setting information is stored, and the same language information is set automatically.

Figure 12:
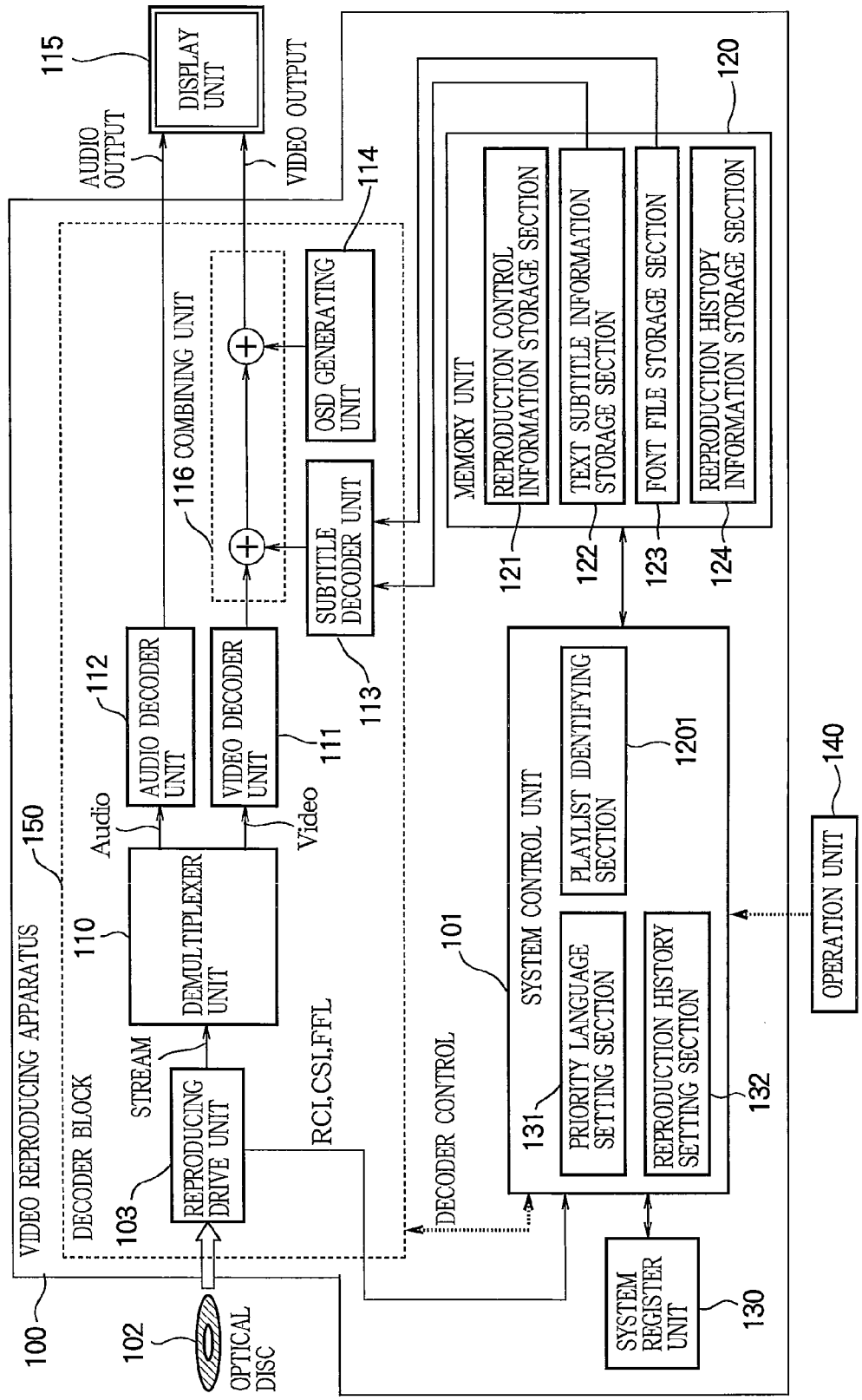
FIG. 12 is a block diagram showing a video reproducing apparatus in a second embodiment according to the present invention.

FIG. 12 shows a block diagram of the system configuration of the video reproducing apparatus 100 in a second embodiment according to this invention. The playlist identifying section 1201, also referred to as the program title identifying section, stores a disc identification number, studio identification number, and playlist number in the reproduction history records 600 in the reproduction history information recorded in the reproduction history information storage section 124, as information identifying the playlist 504. The second embodiment will be described with reference to FIGS. 2 to 5 and FIGS. 7 to 13, where structures similar to those described in the first embodiment have the same reference numerals.

FIG. 13 is a drawing showing an example of the data structure of the reproduction history information recorded in the reproduction history information storage section 124 recorded in the second embodiment according to the present invention. The reproduction history records 1300 in the second embodiment include a disc identification number 1301, a studio identification number 1302, and a playlist number 1303 in addition to the components in the first embodiment. The Disc_ID 502 and Studio_ID 501 to which the playlist currently being reproduced belongs and the number of the playlist 504 are recorded in this information in the step (S403) of adding a reproduction history record 600 in the first embodiment.

An exemplary procedure for creating the subtitle language usage history list 702 of the subtitle languages used previously for playlists 504 will now be described, using the reproduction history information shown in the second embodiment. An exemplary case in which reproduction history information has been generated as in FIG. 13 will be described. If the disc identification number 1301 of the playlist 504 currently being reproduced is '123', the studio identification number 1302 is '456', and the playlist number 1303 is '001', the reproduction history records 1300 identifying this same playlist 504 are extracted. In this case, the matching reproduction history records 1300 are (#1) and (#4); for each subtitle language set in these reproduction history records 1300, the subtitle languages 601 for which the sum of the reproduction times 603 is long are found, and a usage frequency list 702 is generated in descending sequence of length of time.

The usage frequency list created in FIG. 13 has 'Japanese' followed by 'Chinese'. In the second embodiment, the list is simply made up in order starting from the language with longest sum of reproduction times 603, but the usage frequency list 702 may be restructured by one or a combination of the following criteria: 'order of frequency of subtitle switching'; 'order of latest switching date and time'; 'the most recently switched language'.

Except for the content of the reproduction history information described with reference to FIG. 13 and the means of generating the usage frequency list 702 generated from the reproduction history information, the operational model is the same as in the first embodiment, so a description will be omitted.

In summary, in the second embodiment, when a playlist that has already been reproduced is reproduced again, only its previous reproduction history information is obtained, text subtitle streams and font information are read into the preload buffers (122, 123) in an order determined from the reproduction history information that has been read, and subtitle images are generated from these text subtitle streams and this font information and displayed overlaid on the video information of the AV stream. Alternatively, the above process can be carried out only for playlist program titles that have been produced at least a certain number of times within a certain period.

As an effect of the second embodiment, by recording subtitle language reproduction history information and information identifying the playlist 504 in combination, for a playlist 504 in an optical disc 102 that the user views very frequently, the text subtitle language setting related to that playlist 504 can be read automatically, and in preloading, that text subtitle language setting can be given priority. This configuration makes it possible to make an automatic language setting for each playlist 504 in the optical disc 102 individually.

Third Embodiment

In the third embodiment, attribute information set by the user for display of text subtitles in relation to the playlist 504 being reproduced while reproduction was halted or the like can be recorded in the reproduction history, the reproduction history can be read at the resumption of reproduction, and the text subtitle attribute information can be re-set. The feature of this is that a video reproducing apparatus 100 can be provided that can automatically set up exactly the same environment as the conditions in the previous viewing.

Figure 14:
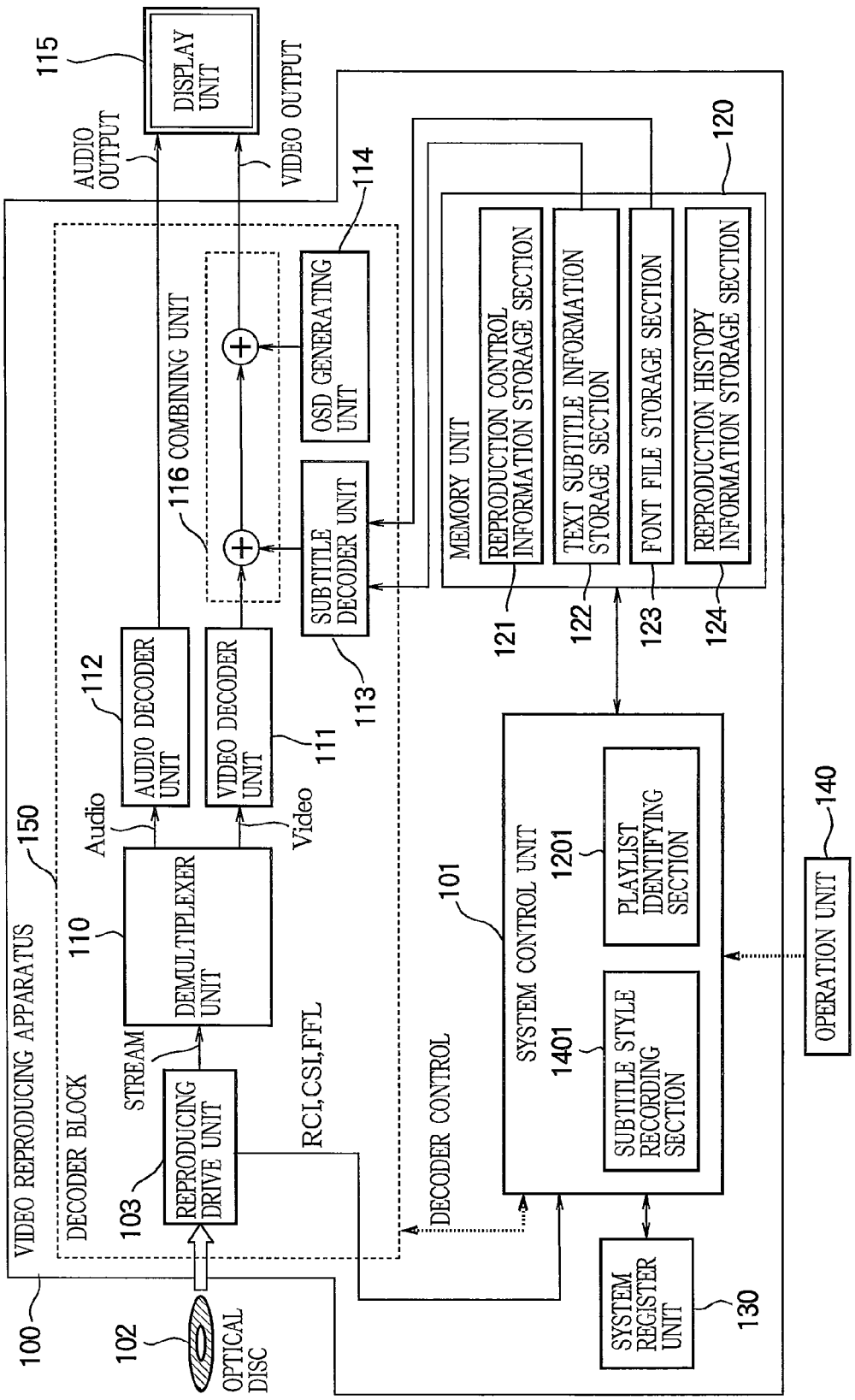
FIG. 14 is a block diagram showing a video reproducing apparatus in a third embodiment according to the present invention.

FIG. 14 shows a block diagram of the system configuration of the video reproducing apparatus 100 in the third embodiment according to this invention. The subtitle style recording section 1401 records, in the reproduction history information storage section 124, a reproduction history concerning text subtitle attribute settings made when reproduction is halted. The text subtitle attribute settings include information on the color, position, size, and style (bold, italic, bordered) of the characters. The third embodiment will be described with reference to FIGS. 2 to 5 and FIGS. 14 to 17, where structures similar to those described in the first and second embodiments have the same reference numerals.

Figure 15:
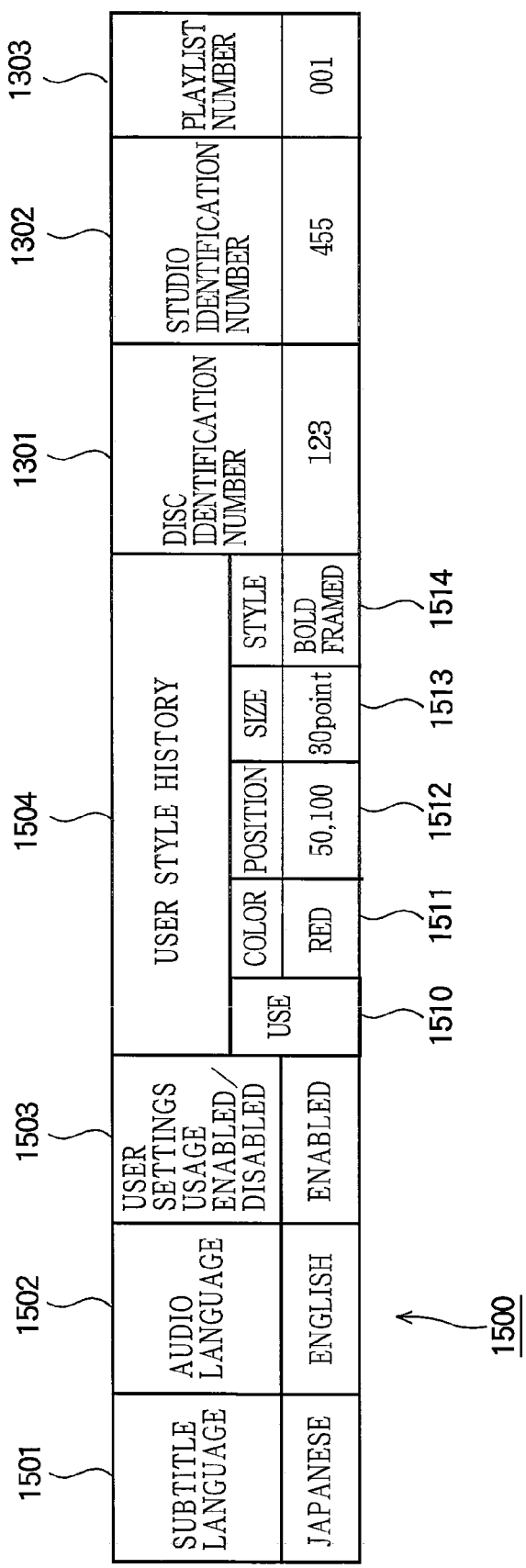
FIG. 15 is a drawing illustrating the data structure of the subtitle style attribute information shown in the third embodiment according to the present invention.

FIG. 15 illustrates the data structure of the subtitle style attribute information 1500 recorded in the reproduction history information storage section 124. The subtitle style attribute information 1500 comprises the subtitle language 1501, the audio language 1502, the user settings usage enabled/disabled status 1503, the user style history 1504, the Disc_ID 1301, the Studio_ID 1302, and the playlist number 1303.

The subtitle language 1501 indicates the subtitle language used for the playlist 504; the audio language 1502 indicates the audio language used for the playlist 504. The user settings usage enabled/disabled status 1503 indicates whether the style of the text subtitles for the playlist 504 can be freely changed by settings made on the video reproducing apparatus 100. The user style history 1504 is information indicating the style in which the playlist 504 was reproduced. Reference numeral 1510 indicates user style used/not-used information, and the text subtitle color is recorded in 1511, the text subtitle position in 1512, the text subtitle size in 1513, and the text subtitle style in 1514.

Figure 16:
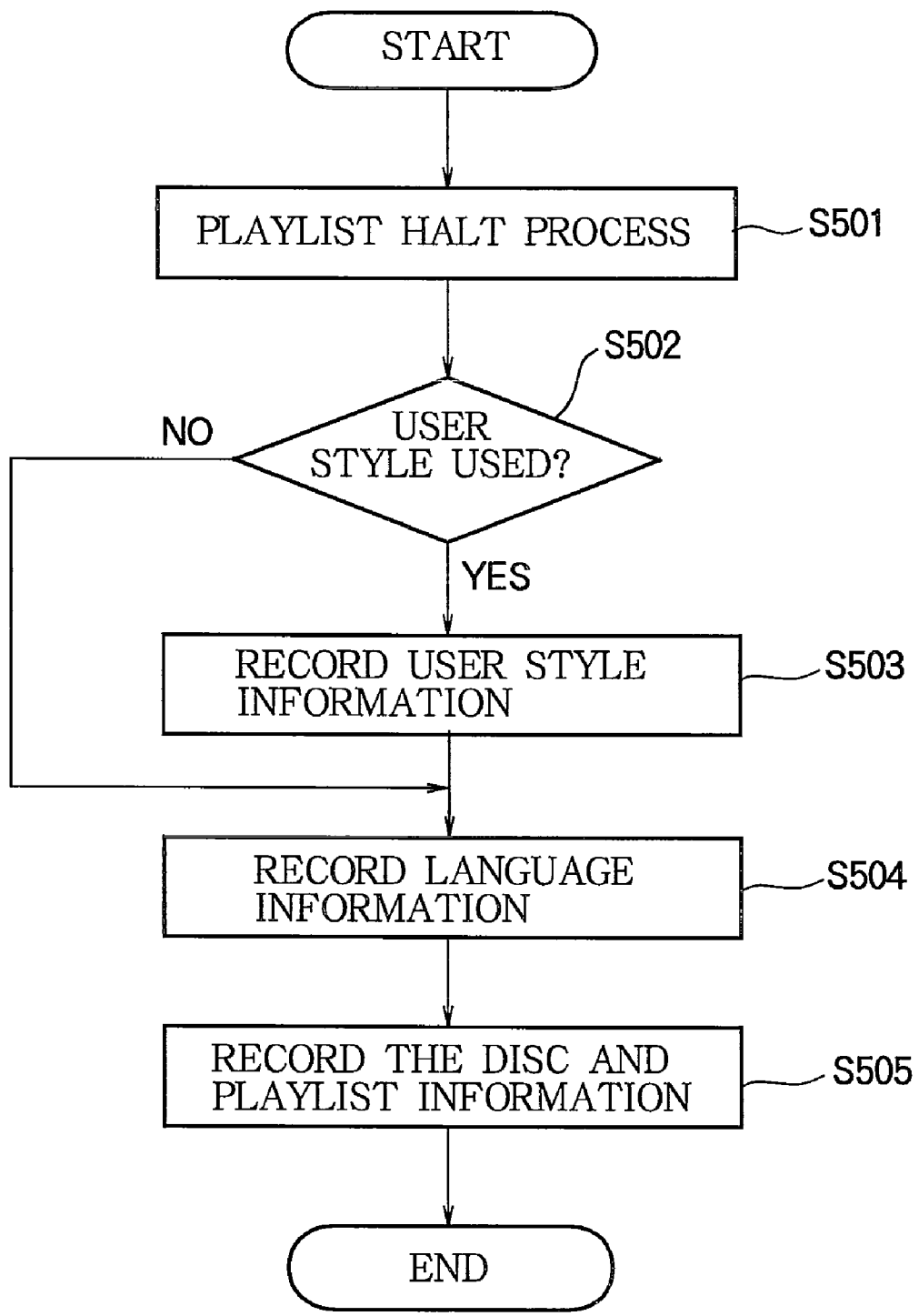
FIG. 16 is a drawing illustrating a processing procedure followed when reproduction is halted in the third embodiment according to the present invention.

FIG. 16 illustrates a processing procedure followed when reproduction is halted in the third embodiment. When the reproduction of the playlist 504 is halted (S501), whether the function (user style function) enabling the video reproducing apparatus 100 to freely change the style of the text subtitles currently being reproduced was being used is decided (S502). If this function was being used, the user style used/not-used information 1510 is set to 'used' and the user settings usage enabled/disabled status 1503 is set to 'allowed', and the text subtitle color 1511, text subtitle position 1512, text subtitle size 1513, and text subtitle style 1514 of the user style are recorded (S503).

In the example shown in FIG. 15, information indicating 'red' is recorded as the text subtitle color 1511, information indicating that the horizontal position is 50 and the vertical position is 100 is recorded as the text subtitle position 1512, information indicating 30-point size is recorded as the text subtitle size 1513, and information indicating bold style with a border is recorded as the text subtitle style 1514.

If the user style function was not being used, the user style used/not-used information 1510 is set to 'not-used', and the process proceeds to step S504. If user style settings are forbidden for the playlist 504 by the optical disc 102, 'forbidden' is set for the user settings usage enabled/disabled 1503.

After that, the subtitle style recording section 1401 obtains the language in which the subtitle display and audio output were being reproduced, and sets them as the subtitle language 1501 and audio language 1502 in the subtitle style attribute information 1500 (S504).

The disc identification number 1301, studio identification number 1302, and playlist number 1303 are obtained by the playlist identifying section 1201 by the same procedure as in the second embodiment and set in the subtitle style attribute information 1500 (S505). In the third embodiment, an example is shown in which the playlist identifying section 1201 obtains the number identifying the playlist 504 and sets it in the subtitle style attribute information 1500, but information that identifies the playlist 504, such as the disc identification number 1301, need not be present. In this case, the process in step S505 is omitted.

FIG. 17 illustrates a processing procedure followed when reproduction is resumed in the third embodiment. When the reproduction of the playlist 504 is resumed (S601), it is checked whether the subtitle style attribute information 1500 shown in FIG. 15 is present in the reproduction history information storage section 124 (S602). If the disc identification number 1301, studio identification number 1302, and playlist number 1303 in the subtitle style attribute information 1500 are identical to those of the playlist 504 the reproduction of which is about to begin, the process proceeds to step S603. If the subtitle style attribute information 1500 is not present, or if the playlist 504 identified by the information in the subtitle style attribute information 1500 is different from the playlist 504 now commanded to be reproduced, the processing shown in the third embodiment ends. When there is no information such as the disc identification number 1301 for identifying the playlist in the subtitle style attribute information 1500, the process of deciding whether the optical disc 102 is the same is unnecessary.

After that, the subtitle language 1501 and audio language 1502 are read from the subtitle style attribute information 1500 and the preloading of the subtitle language is carried out. The output setting of the language used for audio is also made (S603). The user settings usage enabled/disabled status 1503 and the user style used/not-used information 1510 are retrieved from the subtitle style attribute information 1500 (S604). If the result is that user settings are usable and a user style was being used, the text subtitle color 1511, text subtitle position 1512, text subtitle size 1513, and text subtitle style 1514 are read and preloaded, and the text subtitle display settings on the video reproducing apparatus 100 are carried out based on that information (S605). If the user style cannot be used in step S604, the process proceeds to S606.

In step S606, a subtitle display command from the user is awaited (S606), and on reception of the subtitle display command, the text subtitles are displayed (S607).

As an effect of the third embodiment, because style setting information relating to the text subtitles associated with the reproduced program title can be recorded, the color, position, size, and style of the characters associated with the text subtitle information can be stored after preloading of the subtitle language. Therefore, when reproduction is resumed, the color, position, size and style of the characters can be automatically set again.

What is claimed is:

1. A video reproducing apparatus that reproduces a playlist by reproducing an audio-video multiplexed AV stream recorded on a portable recording medium, generating subtitle images from font information and one or more text subtitle streams containing language information corresponding to the AV stream, and displaying the subtitle images, said video reproducing apparatus comprising:
   a preload buffer section into which the text subtitle stream and the font information can be read before the AV stream is reproduced;
   a reproduction history storage section in which reproduction history information at the time when the video reproducing apparatus reproduces an AV stream from the portable recording medium is recorded, said reproduction history information including a frequency of use of each subtitle language for each reproduced playlist, including an identification information of the portable recording medium from which the playlist was reproduced; and
   a priority setting section for reading the reproduction history information recorded in the reproduction history storage section and assigning sequence positions to the subtitle languages with a frequency of use for reproduction of the playlist not less than a predetermined value, among the subtitle languages related to the playlist to be reproduced;
   wherein before the AV stream is reproduced, within the memory capacity of the preload buffer section, said one or more text subtitle streams and the font information are read into the preload buffer section in a sequence of frequency of use determined by the priority setting section, a subtitle image is generated from the text subtitle stream and the font information, and the subtitle image is displayed overlaid on image information of the AV stream.

2. The video reproducing apparatus of claim 1, wherein reproduction time not shorter than a predetermined value is recorded as the reproduction history information, and the priority setting section assigns sequence positions by assigning earlier positions to subtitle languages with greater total reproduction time with subtitle display in the reproduction history information.

3. The video reproducing apparatus of claim 1, wherein the priority setting section assigns sequence positions by assigning earlier positions to subtitle languages to which subtitle display was switched more often in the reproduction history information.

4. The video reproducing apparatus of claim 1, wherein the priority setting section assigns sequence positions by assigning earlier positions to subtitle languages with most recent subtitle display reproduction time in the reproduction history information.

5. A video reproducing apparatus that reproduces a playlist by reproducing an audio-video multiplexed AV stream recorded on a portable recording medium, generating subtitle images from font information and one or more text subtitle streams containing language information corresponding to the AV stream, and displaying the subtitle images, said video reproducing apparatus comprising:
   a preload buffer section into which the text subtitle stream and the font information can be read before the AV stream is reproduced; and
   a reproduction history storage section in which text subtitle style information at the time when the video reproducing apparatus reproduces an AV stream from the portable recording medium is recorded, said text subtitle style information indicating the text subtitle style used when the playlist was reproduced, in association with the playlist information indicating the playlist was reproduced;
   wherein before the AV stream is reproduced for the purpose of reproduction of the playlist, said text subtitle stream and the font information are read into the preload buffer section according to the subtitle style information indicating the subtitle style used when the playlist was reproduced previously, held in the reproduction history storage section, text subtitle settings are performed according to the subtitle style information indicating the subtitle style used when the playlist was produced previously, and then a subtitle image is generated from the text subtitle stream and the font information and the subtitle image is displayed overlaid on image information of the AV stream.

6. A video reproducing method that reproduces a playlist by reproducing an audio-video multiplexed AV stream recorded on a portable recording medium, generating subtitle images from font information and one or more text subtitle streams containing language information corresponding to the AV stream, and displaying the subtitle images, said video reproducing method comprising:
   a step of reading the text subtitle streams and the font information into a preload buffer means before the AV stream is reproduced from the portable recording medium, said reproduction history information including a frequency of use of each subtitle language for each reproduced playlist, including an identification information of the portable recording medium from which the playlist was reproduced;
   a step of recording reproduction history information at the time when an AV stream is reproduced; and
   a step of reading the recorded reproduction history information and assigning sequence positions to the subtitle languages with a frequency of use for reproduction of the playlist not less than a predetermined value, among the subtitle languages related to the playlist to be reproduced;
   wherein before the AV stream is reproduced, within the memory capacity of the preload buffer section, said one or more text subtitle streams and the font information are read into the preload buffer means in a sequence determined from the frequency of use, and a subtitle image is generated from the text subtitle stream and the font information and displayed overlaid on image information of the AV stream.

7. The video reproducing method of claim 6, wherein reproduction time not shorter than a predetermined value is recorded as the reproduction history information, and sequence positions are assigned by assigning earlier positions to subtitle languages with greater total reproduction time with subtitle display in the reproduction history information.

8. The video reproducing method of claim 6, wherein sequence positions are assigned by assigning earlier positions to subtitle languages to which subtitle display was switched more often in the reproduction history information.

9. The video reproducing method of claim 6, wherein sequence positions are assigned by assigning earlier positions to subtitle languages with most recent subtitle display reproduction time in the reproduction history information.

10. A video reproducing method that reproduces a playlist by reproducing an audio-video multiplexed AV stream recorded on a portable recording medium, generating subtitle images from font information and one or more text subtitle streams containing language information corresponding to the AV stream, and displaying the subtitle images, said video reproducing method comprising:
   a step of reading the text subtitle stream and the font information into a preload buffer means before the AV stream is reproduced; and
   a step of recording text subtitle style information at the time when the video reproducing method reproduces an AV stream from the portable recording medium, said text subtitle style information indicating the text subtitle style used when the playlist was reproduced, in association with the playlist information indicating the playlist reproduced, including the identification information of the portable recording medium from which the playlist was reproduced;
   wherein before the AV stream is reproduced for the purpose of reproduction of the playlist, said text subtitle stream and the font information are read into the preload buffer means according to the held subtitle style information indicating the subtitle style used when the playlist was reproduced previously, text subtitle settings are performed according to the subtitle style information indicating the subtitle style used when the playlist was produced previously, and then a subtitle image is generated from the text subtitle stream and the font information and displayed overlaid on image information of the AV stream.

* * * * *